United States Patent
Nagasawa et al.

(10) Patent No.: US 9,967,430 B2
(45) Date of Patent: May 8, 2018

(54) IMAGE FORMING SYSTEM, MOBILE TERMINAL, AND PROGRAM

(71) Applicant: KONICA MINOLTA, INC., Chiyoda-ku, Tokyo (JP)

(72) Inventors: Kenichi Nagasawa, Takatsuki (JP); Toshiya Furubayashi, Takarazuka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/073,530

(22) Filed: Mar. 17, 2016

(65) Prior Publication Data
US 2016/0295072 A1 Oct. 6, 2016

(30) Foreign Application Priority Data

Apr. 3, 2015 (JP) .................................. 2015-077037

(51) Int. Cl.
*G06F 15/00* (2006.01)
*H04N 1/44* (2006.01)
(Continued)

(52) U.S. Cl.
CPC ......... *H04N 1/4413* (2013.01); *G06F 3/1204* (2013.01); *G06F 3/1222* (2013.01); (Continued)

(58) Field of Classification Search
CPC ............ H04N 1/4413; H04N 1/00307; H04N 2201/0094; H04N 2201/0055; (Continued)

(56) References Cited

U.S. PATENT DOCUMENTS

2009/0103124 A1* 4/2009 Kimura ................. G06F 3/1204
358/1.15
2010/0188695 A1 7/2010 Okigami
(Continued)

FOREIGN PATENT DOCUMENTS

JP 2010069686 A 4/2010
JP 2012138970 A 7/2012
(Continued)

OTHER PUBLICATIONS

Japanese Office Action (and English translation thereof) dated Jul. 18, 2017 issued in counterpart Japanese Application No. 2015-077037.
(Continued)

*Primary Examiner* — Saeid Ebrahimi Dehkord
(74) *Attorney, Agent, or Firm* — Holtz, Holtz & Volek PC

(57) ABSTRACT

A non-transitory recording medium storing a computer readable program causes a computer incorporated in a mobile terminal to execute the steps of: a) acquiring apparatus specifying information in order for a user to determine whether an information processing apparatus to cooperate with the mobile terminal is a desired information processing apparatus using a proximity wireless communication with the information processing apparatus; b) displaying, on an operation unit of the mobile terminal, a confirmation message which is a confirmation message to confirm execution of a cooperative action with the information processing apparatus and includes the apparatus specifying information; and c) executing the cooperative action in response to a confirmation operation to the confirmation message by the user.

21 Claims, 19 Drawing Sheets

(51) Int. Cl.
*H04N 1/00* (2006.01)
*G06F 3/12* (2006.01)

(52) U.S. Cl.
CPC .......... *G06F 3/1236* (2013.01); *G06F 3/1292* (2013.01); *H04N 1/00307* (2013.01); *H04N 2201/0055* (2013.01); *H04N 2201/0094* (2013.01)

(58) Field of Classification Search
CPC .... G06F 3/1204; G06F 3/1236; G06F 3/1222; G06F 3/1292
See application file for complete search history.

(56) References Cited

U.S. PATENT DOCUMENTS

| | | | | |
|---|---|---|---|---|
| 2011/0261389 | A1* | 10/2011 | Ohara | H04M 11/066 358/1.15 |
| 2013/0321864 | A1 | 12/2013 | Jintsugawa et al. | |
| 2014/0139873 | A1* | 5/2014 | Ishida | H04W 4/008 358/1.15 |
| 2014/0211254 | A1 | 7/2014 | Takeuchi et al. | |
| 2015/0052339 | A1 | 2/2015 | Suzuki | |
| 2016/0269384 | A1 | 9/2016 | Suga | |

FOREIGN PATENT DOCUMENTS

| | | |
|---|---|---|
| JP | 2013247606 A | 12/2013 |
| JP | 2014146203 A | 8/2014 |
| JP | 2015033084 A | 2/2015 |
| JP | 2015036934 A | 2/2015 |
| JP | 2016170702 A | 9/2016 |

OTHER PUBLICATIONS

Japanese Office Action (and English translation thereof) dated Apr. 25, 2017, issued in counterpart Japanese Application No. 2015-077037.

Japanese Office Action dated Jan. 23, 2018 issued in counterpart Japanese Application No. 2015-077037.

* cited by examiner

| MAC ADDRESS | IP ADDRESS | MODEL NAME | APPARATUS NAME |
|---|---|---|---|
| 11:22:33:44:55:66 | 192.168.30.1 | C652 | 6TH FLOOR EAST SIDE 1 |

| MAC ADDRESS | IP ADDRESS | AUTHENTICATION INFORMATION ||
|---|---|---|---|
| | | USER ID | PASSWORD |
| 11:22:33:44:55:66 | 192.168.30.1 | SUZUKI1 | ****** |
| 11:22:33:44:55:77 | 192.168.30.2 | SUZUKI2 | **** |

| MAC ADDRESS | IP ADDRESS | MODEL NAME | APPARATUS NAME | AUTHENTICATION INFORMATION | |
|---|---|---|---|---|---|
| | | | | USER ID | PASSWORD |
| 11:22:33:44:55:66 | 192.168.30.1 | C652 | 6TH FLOOR EAST SIDE 1 | SUZUKI1 | ****** |
| 11:22:33:44:55:77 | 192.168.30.2 | C453 | 6TH FLOOR EAST SIDE 2 | SUZUKI2 | **** |

IMAGE FORMING SYSTEM, MOBILE TERMINAL, AND PROGRAM

The entire disclosure of Japanese Patent Application No. 2015-077037 filed on Apr. 3, 2015 including description, claims, drawings, and abstract are incorporated herein by reference in its entirety.

BACKGROUND OF THE INVENTION

Field of the Invention

The present invention relates to a mobile terminal which performs a cooperative action with an information processing apparatus (image forming apparatus) and a technology related thereto.

Description of the Related Art

There is a technology so that an image forming apparatus, such as a multi-functional peripheral (MFP), and an external mobile terminal thereof cooperate with each other (JP 2012-138970 A).

Various wireless communication technologies can be used for the communication between an image forming apparatus and a mobile terminal. For example, a communication based on the wireless LAN (IEEE 802.11 or the like) and/or a proximity wireless communication is used. As a proximity wireless communication, there are a communication based on the Bluetooth (registered trademark) standard and a communication based on the Bluetooth low energy (BLE) which is the extended standard of the Bluetooth.

By applying such wireless communications to a communication between an image forming apparatus and a mobile terminal, various applied technologies are created.

For example, an image forming apparatus transmits radio waves in the periphery using the BLE or the like, and a mobile terminal moving to the periphery of the image forming apparatus receives the radio waves from the BLE, and thus the mobile terminal can detect the proximity to the image forming apparatus.

Furthermore, it is possible for the mobile terminal to start various cooperative actions (for example, an authentication action and the like) in response to the detection of the proximity to the image forming apparatus.

However, in the case where a plurality of (for example, two) image forming apparatuses are arranged side by side or the like, the authentication action to an apparatus different from an originally intended one may proceed due to the arrangement condition and/or the radio wave condition of the apparatus. More particularly, although a user has an intention to proceed with a cooperative action with a certain image forming apparatus, the mobile terminal may proceed with the cooperative action with another image forming apparatus adjacent to the certain image forming apparatus (an apparatus different from the user's desired image forming apparatus). In this case, the authentication action to the other image forming apparatus would proceed against the user's intention.

Note that, such a situation can similarly occur in other cooperative actions as well as in the authentication action.

SUMMARY OF THE INVENTION

An object of the present invention is to provide a technology which enable to confirm whether an information processing apparatus which is a cooperation destination of a mobile terminal is a user's desired target apparatus when a cooperative action between the information processing apparatus (image forming apparatus) and the user's mobile terminal is performed.

To achieve the abovementioned object, according to an aspect, a non-transitory recording medium storing a computer readable program, reflecting one aspect of the present invention, causes a computer incorporated in a mobile terminal to execute the steps of: a) acquiring apparatus specifying information in order for a user to determine whether an information processing apparatus to cooperate with the mobile terminal is a desired information processing apparatus using a proximity wireless communication with the information processing apparatus; b) displaying, on an operation unit of the mobile terminal, a confirmation message which is a confirmation message to confirm execution of a cooperative action with the information processing apparatus and includes the apparatus specifying information; and c) executing the cooperative action in response to a confirmation operation to the confirmation message by the user.

To achieve the abovementioned object, according to an aspect, a mobile terminal reflecting one aspect of the present invention comprises: an acquisition unit which acquires apparatus specifying information which is information in order for a user to determine whether an information processing apparatus to cooperate with the mobile terminal is a desired information processing apparatus using a proximity wireless communication with the information processing apparatus, a display unit which displays a confirmation message, which is a confirmation message to confirm execution of a cooperative action with the information processing apparatus and includes the apparatus specifying information, on the display unit, and an action execution unit which executes the cooperative action in response to a confirmation operation to the confirmation message by a user.

To achieve the abovementioned object, according to an aspect, an image forming system reflecting one aspect of the present invention comprises: an image forming apparatus; and a mobile terminal configured to perform a cooperative action with the image forming apparatus, wherein the mobile terminal includes an acquisition unit which acquires apparatus specifying information which is information in order for a user to determine whether an image forming apparatus to cooperate with the mobile terminal is a desired image forming apparatus using a proximity wireless communication with the image forming apparatus, a display unit which displays a confirmation message, which is a confirmation message to confirm execution of a cooperative action with the image forming apparatus and includes the apparatus specifying information, on the display unit, and an action execution unit which executes the cooperative action in response to a confirmation operation to the confirmation message by the user.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 12 is a diagram illustrating an apparatus data table in the MFP;

FIG. 13 is a diagram illustrating a registration data table in the mobile terminal;

FIG. 20 is a diagram illustrating a registration data table according to a modification example.

DESCRIPTION OF THE PREFERRED EMBODIMENTS

Hereinafter, an embodiment of the present invention will be described with reference to the drawings. However, the scope of the invention is not limited to the illustrated examples.

1. Outline of Configuration

Figure 1:
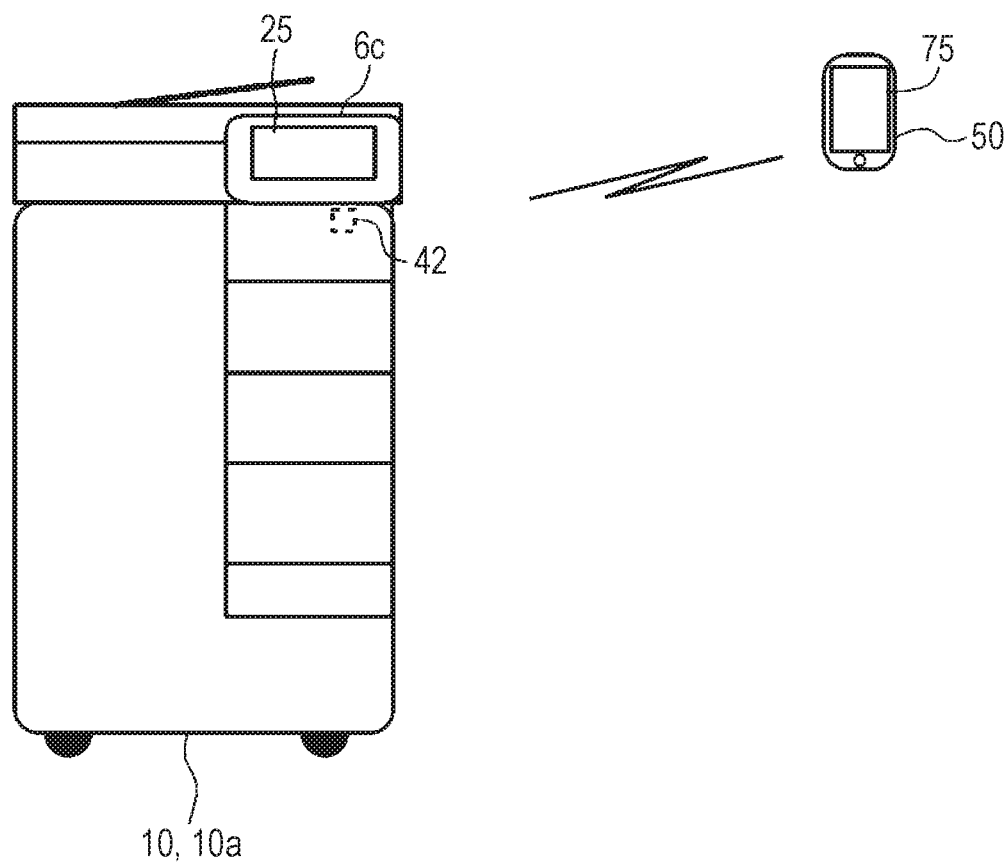
FIG. 1 is a diagram illustrating an image forming system.

FIG. 1 is a diagram illustrating an image forming system 1 according to an embodiment of the present invention. As illustrated in FIG. 1, the image forming system 1 includes an MFP (image forming apparatus) 10 and a mobile terminal 50.

The MFP 10 and the mobile terminal 50 are wirelessly connected with each other using various wireless communication technologies. For example, a wireless LAN (IEEE 802.11 or the like) communication and a proximity wireless communication can be used for the communication between the MFP 10 and the mobile terminal. In the embodiment, a communication based on the Bluetooth low energy (BLE) is used as a proximity wireless communication, and proximity determination processing between the mobile terminal 50 and the MFP 10 or the like is performed.

2. Configuration of the Image Forming Apparatus

Figure 2:
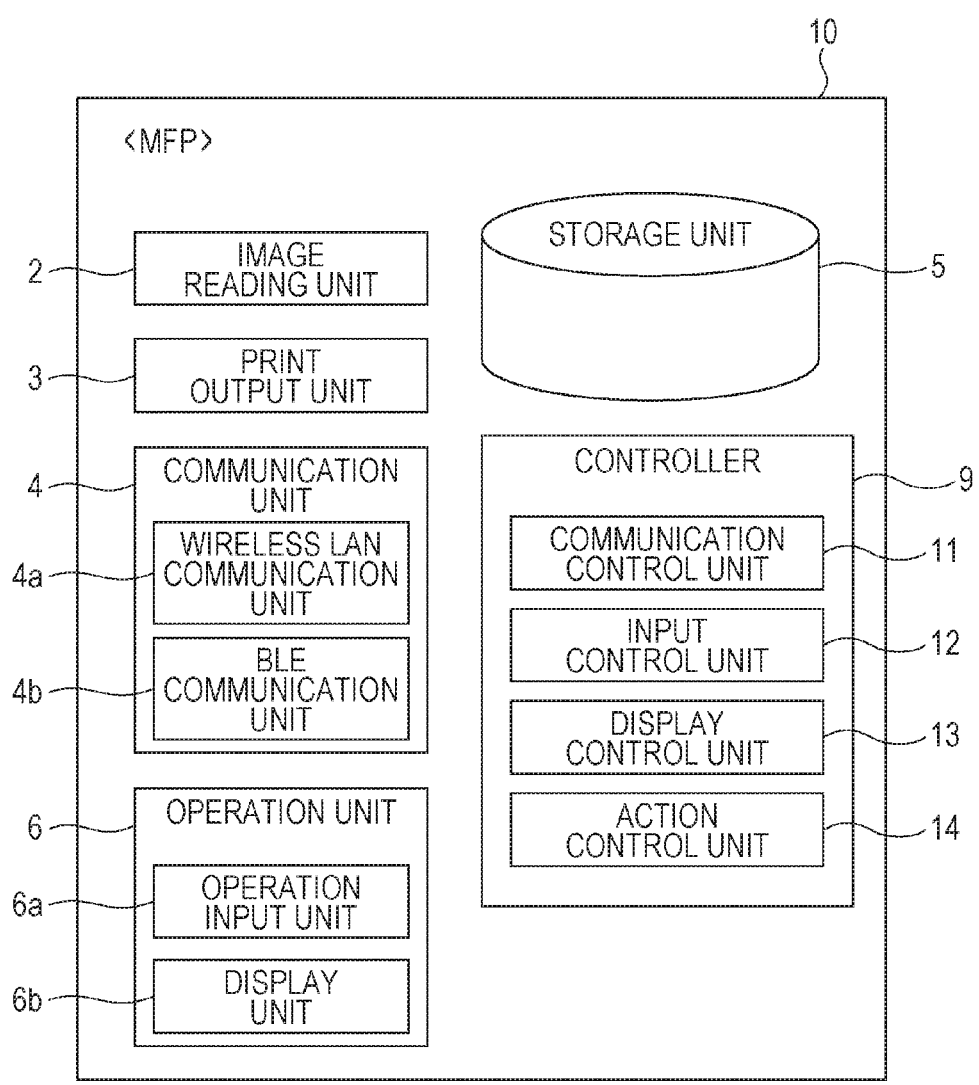
FIG. 2 is a diagram illustrating functional blocks of an image forming apparatus.

FIG. 2 is a diagram illustrating functional blocks of the image forming apparatus 10; Here, a multi-functional peripheral (MFP) will be exemplified as the image forming apparatus 10. FIG. 2 illustrates the functional blocks of the MFP 10.

The MFP 10 is an apparatus including a scan function, a copy function, a facsimile function, and a box storage function (also referred to as a complex machine). Specifically, the MFP 10 includes, as illustrated in the functional block diagram of FIG. 2, an image reading unit 2, a print output unit 3, a communication unit 4, a storage unit 5, an operation unit 6, and a controller 9. These units complexly actions, and various functions are implemented accordingly.

The image reading unit 2 is a processing unit which optically reads (that is, scans) a document placed on a predetermined position of the MFP 10 and generates image data of the document (also referred to as a document image or a scan image). The image reading unit 2 is referred to as a scan unit.

The print output unit 3 is an output unit which outputs a print of an image on various mediums, such as paper, based on data related to a print target.

The communication unit 4 is a processing unit which can perform a facsimile communication via a public line or the like. Furthermore, the communication unit 4 can perform various wireless communications (including a wireless communication based on the BLE). Specifically, the communication unit 4 includes a wireless LAN communication unit 4a which performs a wireless communication based on the wireless LAN (IEEE 802.11 or the like) and a BLE communication unit 4b which performs a wireless communication based on the BLE. The MFP 10 incorporates a BLE chip 42 which functions as a part or whole of the BLE communication unit 4b referred to as a chip for a proximity wireless communication (alternatively, simply as a communication chip)) (see also FIG. 1). The BLE chip 42 can broadcast advertising data. The advertising data includes the media access control (MAC) address of the MFP 10.

The storage unit 5 is configured with a memory apparatus, such as a hard disk drive (HDD).

The operation unit 6 includes an operation input unit 6a which accepts operation input to the MFP 10, and a display unit 6b which outputs display of various kinds of information.

An operation panel unit 6c having a substantially plate shape (FIG. 1) is provided on the MFP 10. Furthermore, the operation panel unit 6c has a touch panel 25 (FIG. 1) on a front side thereof. The touch panel 25 functions as a part of the operation input unit 6a and also functions as a part of the display unit 6b. The touch panel 25 is configured by embedding various sensors or the like in a liquid crystal display panel, can display various kinds of information, and accept various operation inputs from an operator.

The controller 9 is incorporated in the MFP 10 and is a control device which integrally controls the MFP 10. The controller 9 is configured as a computer system including a CPU and various semiconductor memories, such as a RAM and a ROM. The controller 9 implements various processing units by executing, at a CPU, a predetermined software program stored in the ROM (for example, an EEPROM) (hereinafter, also simply referred to as a program). Note that, the program (particularly, the program module groups) may be installed in the MFP 10 via a portable recording medium, such as a USB memory, a wireless LAN, or the like.

Specifically, illustrated in FIG. 2, the controller 9 implements various processing units including a communication control unit 11, an input control unit 12, a display control unit 13, and an action control unit 14 by executing the above program.

The communication control unit 11 is a processing unit which controls a communication action with other apparatuses (the mobile terminal 50 and the like) in cooperation with the communication unit 4 and the like. The communication control unit 11 includes a transmission control unit which controls a transmission action of various kinds of data, and a reception control unit which controls a reception action of various kinds of data.

The input control unit 12 is a control unit which controls an operation input action to the operation input unit 6a (the touch panel 25 or the like). For example, the input control unit 12 controls an action to accept operation input to an operation screen displayed on the touch panel 25 (designated input and the like from a user).

The display control unit 13 is a processing unit which controls a display action in the display unit 6b (the touch panel 25 or the like). The display control unit 13 displays, on the touch panel 25, an operation screen (remote operation screen) 200 or the like to operate the MFP 10.

The action control unit 14 is a processing unit which controls various actions (an authentication action, a print output action, a scan action, and the like).

3. Configuration of the Mobile Terminal

Next, the configuration of the mobile terminal 50 will be described.

The mobile terminal 50 is an apparatus which can perform a cooperative action with the MFP 10 (image forming apparatus).

Specifically, the mobile terminal 50 is an information input/output terminal apparatus (information terminal) which can perform a network communication with the MFP 10. Here, a smartphone is exemplified as the mobile terminal 50. However, the mobile terminal 50 is not limited to this and may be a tablet terminal or the like.

Figure 3:
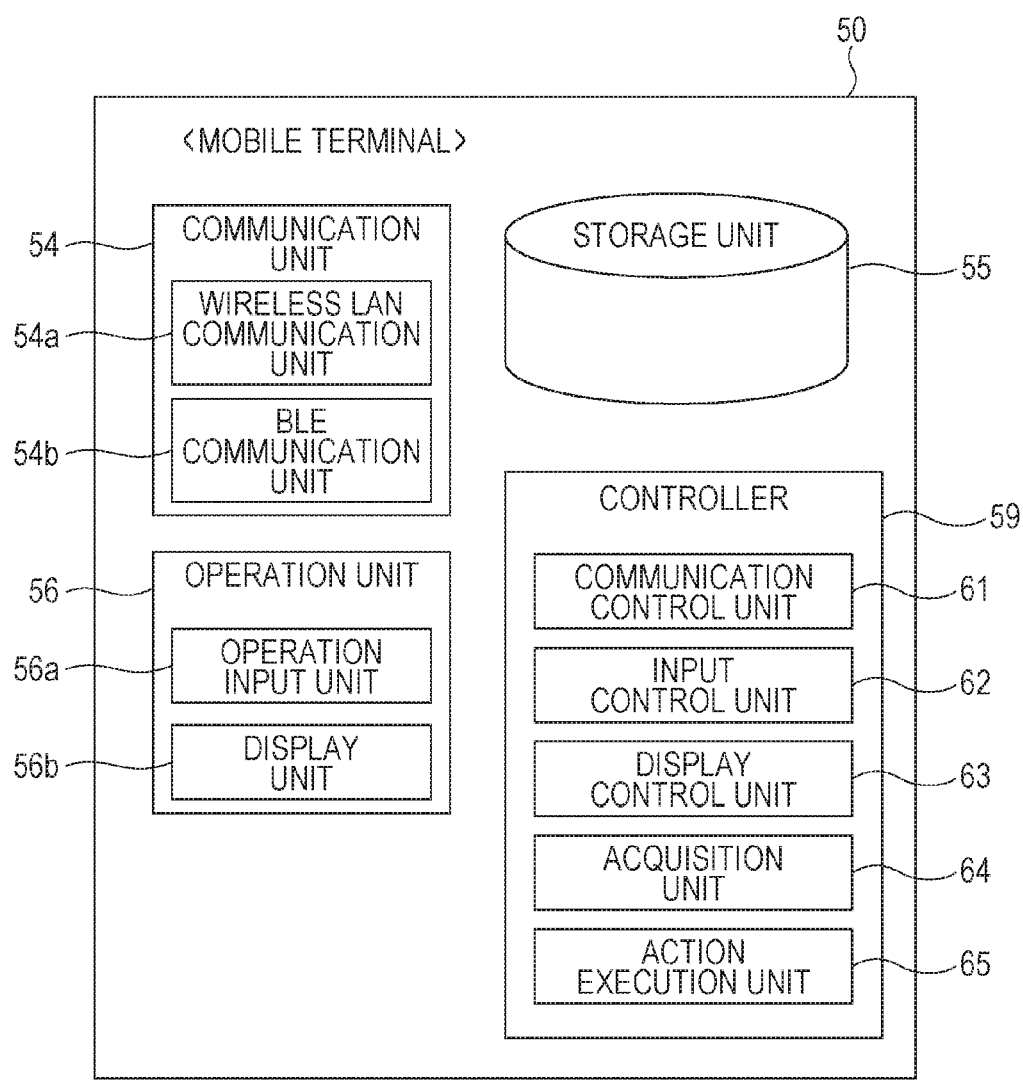
FIG. 3 is a functional block diagram illustrating a schematic configuration of a mobile terminal.

FIG. 3 is a functional block diagram illustrating a schematic configuration of the mobile terminal 50;

The mobile terminal 50 includes, as illustrated in the functional block diagram of FIG. 3, a communication unit 54, a storage unit 55, an operation unit 56, and a controller 59. These units complexly actions, and various functions are implemented accordingly.

The communication unit 54 can perform various wireless communications (including a wireless communication based on the BLE). Specifically, the communication unit 54 includes a wireless LAN communication unit 54a which performs a wireless communication based on the wireless LAN (IEEE 802.11 or the like), and a BLE communication unit 54b which performs a wireless communication based on the BLE. The BLE communication unit 54b receives the advertising data to be broadcasted from the BLE chip 42 incorporated in the MFP 10, and measures the intensity of the radio wave for data transmission.

The storage unit 55 is configured with a memory apparatus, such as a nonvolatile semiconductor memory. In the storage unit 55, various screens 500, which will be described later, (see FIG. 14 and the like) (particularly, the display data thereof) are stored.

The operation unit 56 includes an operation input unit 56a which accepts operation input to the mobile terminal 50 and a display unit 56b which outputs display of various kinds of information. A touch panel 75 configured by embedding various sensors and the like in a liquid crystal display panel (FIG. 1) is provided on the mobile terminal 50. The touch panel 75 functions as a part of the operation input unit 56a and also functions as a part of the display unit 56b.

For example, the touch panel 75 displays a confirmation message (to be described later) and the like to confirm execution of a cooperative action with an image forming apparatus. Furthermore, the touch panel 75 accepts the operation input and the like to the confirmation message.

The controller 59 of FIG. 3 is incorporated in the mobile terminal 50, and is a control device which integrally controls the mobile terminal 50. The controller 59 is configured as a computer system including a CPU and various semiconductor memories, such as a RAN and a ROM. The controller 59 implements various processing units by executing, at a CPU, a predetermined software program stored in a memory unit (semiconductor memory or the like) (hereinafter, also simply referred to as a program). Note that, the program (particularly, the program module group) may be installed in the mobile terminal 50 via a portable recording medium, such as a USB memory, a wireless LAN, or the like.

A program to cooperate with the MFP 10 (a program for cooperation) or the like has been installed in the mobile terminal 50. The program for cooperation is an application software program which implements various kinds of processing including proximity detection processing to the MFP 10 (also simply referred to as an application).

Specifically, the controller 59 implements various processing units including a communication control unit 61, an input control unit 62, a display control unit 63, an acquisition unit 64, and an action execution unit 65 by executing the program for cooperation or the like.

The communication control unit 61 is a processing unit which controls a communication action with the MFP 10 and the like in cooperation with the communication unit 54 and the like.

The input control unit 62 is a control unit which controls an operation input action to the operation input unit 56a (the touch panel 75 or the like).

The display control unit 63 is a processing unit which controls a display action in the display unit 56b (the touch panel 75 or the like). The display control unit 63 controls a display action of, for example, confirmation messages (also referred to as a confirmation message display screen) 500 and 700 (to be described later) and the like.

The acquisition unit 64 is a processing unit which acquires apparatus specifying information (to be described later). The acquisition unit 64 acquires the apparatus specifying information on the MFP 10 using the proximity wireless communication with the MFP 10.

The action execution unit 65 is a processing unit which executes, in response to a confirmation operation (approval operation) to the confirmation messages 500 and 700 by a user, a predetermined cooperative action (authentication action and the like).

4. Actions

<4-1. Acquiring the Apparatus Specifying Information>

Figure 11:
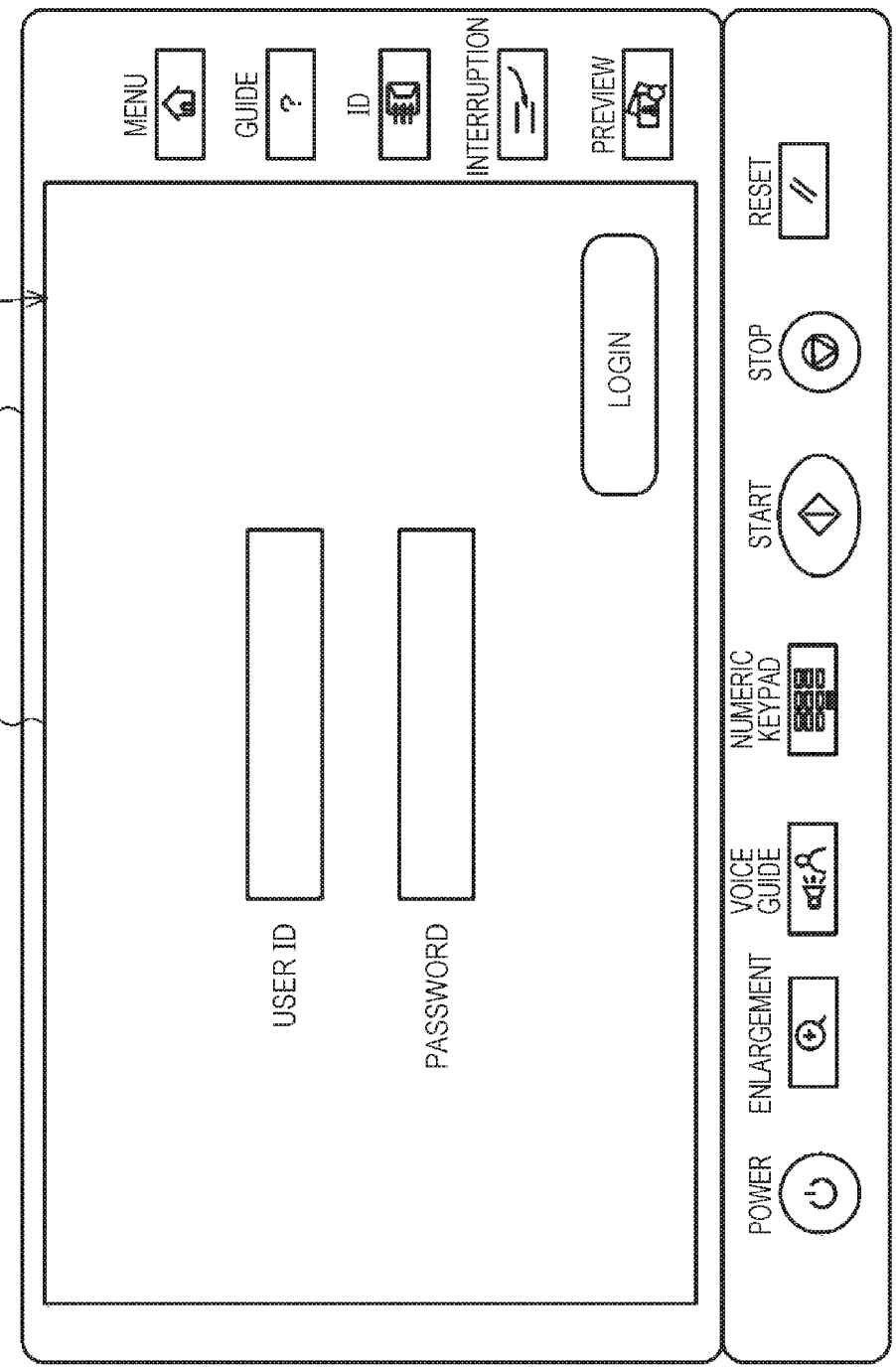
FIG. 11 is a diagram illustrating a display screen (login acceptance screen)

The MFP 10 displays, on the touch panel 25, a login acceptance screen 201 as illustrated in FIG. 11 in a login waiting state (state of waiting for a user's login).

Furthermore, the MFP 10 continuously transmits radio waves for a BLE communication at very-short time intervals. Particularly, the BLE chip 42 incorporated in the MFP 10 (see FIG. 1) broadcasts advertising data at very-short time intervals. The advertising data is broadcast data to be transmitted using radio waves for a proximity wireless communication radio waves for a BLE communication). The radio waves for a BLE communication reaches the peripheral area of the MFP 10 (for example, from several tens of centimeters to several meters).

On the other hand, the mobile terminal 50 receives radio waves for a BLE communication from the MFP 10, and measures the intensity of the radio waves from the MFP 10. Specifically, the BLE communication unit 54b of the mobile terminal 50 receives the advertising data broadcasted from the BLE chip 42 incorporated in the MFP 10, and measures the intensity of the radio wave for data transmission. Furthermore, the program for cooperation installed in the mobile terminal 50 acquires the intensity of the radio wave (in a foreground running state or a background running state). Note that, the program for cooperation may perform a part of the radio wave intensity measurement processing.

Figure 4:
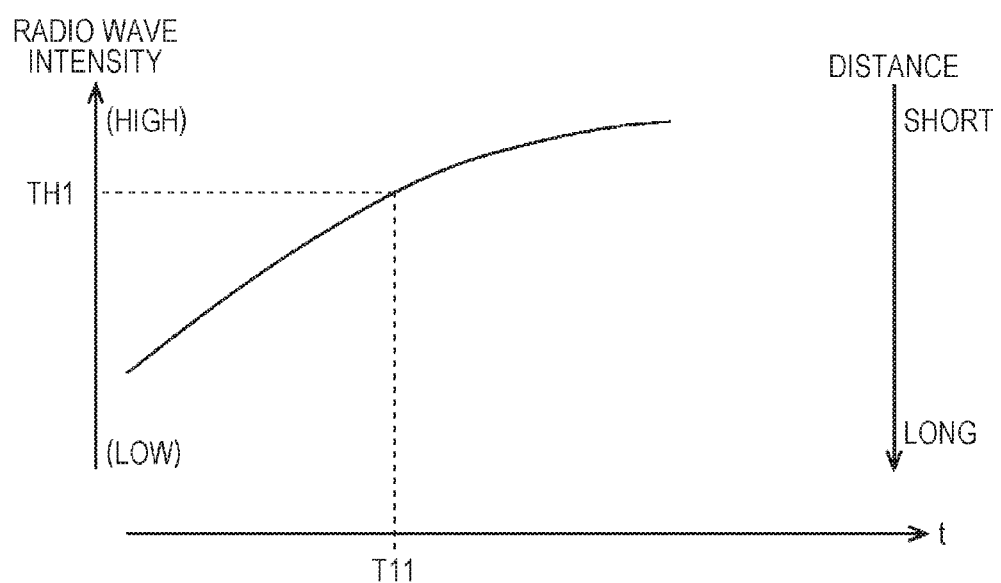
FIG. 4 is a diagram illustrating temporal change of radio wave intensity when the mobile terminal approaches an MFP.

According to an approaching action of the mobile terminal 50, as the mobile terminal 50 approaches the MFP 10 (that is, as the distance between the mobile terminal 50 and the MFP 10 becomes shorter), the radio wave intensity detected by the mobile terminal 50 (the intensity of the BLE radio wave transmitted from the BLE chip 42 of the MFP 10) increases (see FIG. 4). In contrast, as the mobile terminal 50 recedes from the MFP 10 (that is, as the distance between the mobile terminal. 50 and the MFP 10 becomes longer), the radio wave intensity detected by the mobile terminal 50 (the intensity of the BLE radio wave from the MFP 10) decreases.

Figure 5:
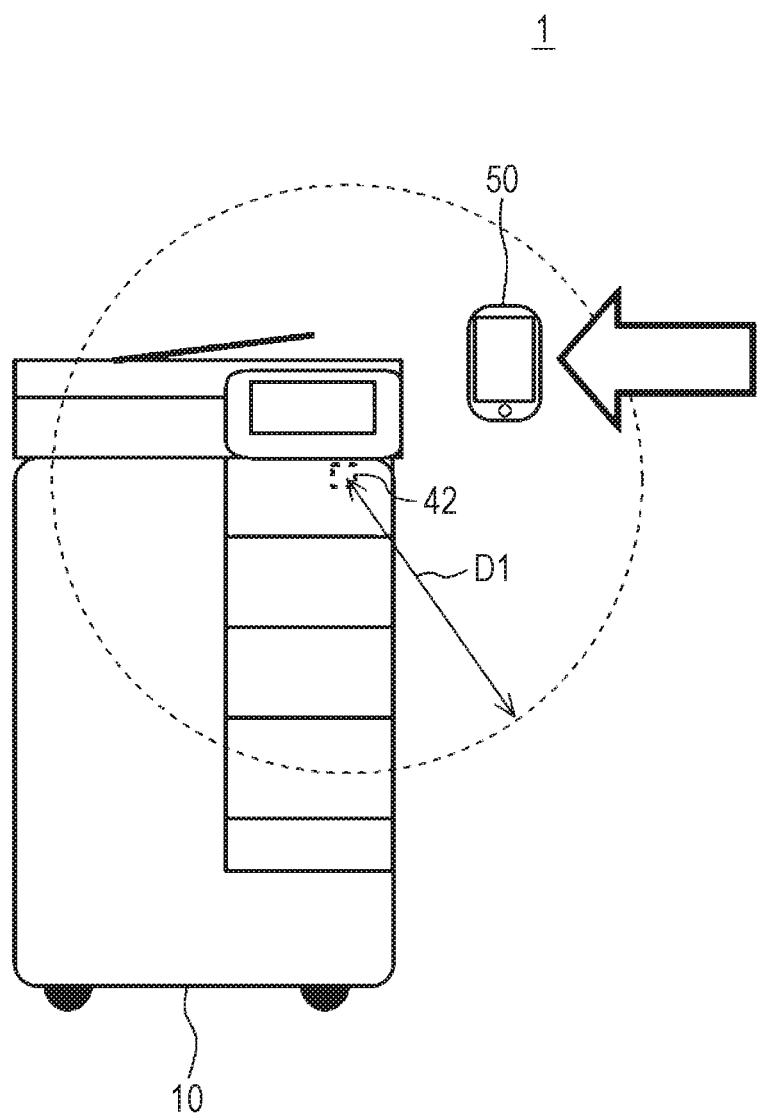
FIG. 5 is a diagram illustrating that the mobile terminal is approaching the MFP.

Using such properties, when the radio wave intensity detected by the mobile terminal 50 is changed (increased) to a value larger than a predetermined threshold TH1, the mobile terminal 50 determines that the terminal itself approaches the MFP 10 (see FIG. 4). Specifically, it is determined that the distance between the mobile terminal 50 and the MFP 10 (more particularly, the arrangement place of the BLE chip 42 in the MFP 10) is within a predetermined range (for example, 20 cm) (a distance equal to or smaller than a predetermined value D1) (see FIG. 5). Note that, it is only required that the value of the radio wave intensity when the distance between the mobile terminal 50 and the MFP 10 is close to a distance D1 (for example, about 20 cm) is measured in advance and the measurement value is set as the threshold TH1.

Specifically, first, as a user approaches the MFP 10, the radio wave intensity detected by the mobile terminal 50 increases. For example, it is assumed that the user holds the mobile terminal 50 with the hand and approaches the MFP 10 and the mobile terminal 50 held with the hand is moved to the vicinity of the touch panel 25. According to the move, the radio wave intensity detected by the mobile terminal 50 increases from a value smaller than the threshold TH1 to a value larger than the threshold TH1 (time T11) (see FIG. 4). In response to the increase detection of the radio wave intensity, the mobile terminal 50 determines that the terminal itself approaches the MFP 10 within the predetermined range.

Figure 6:
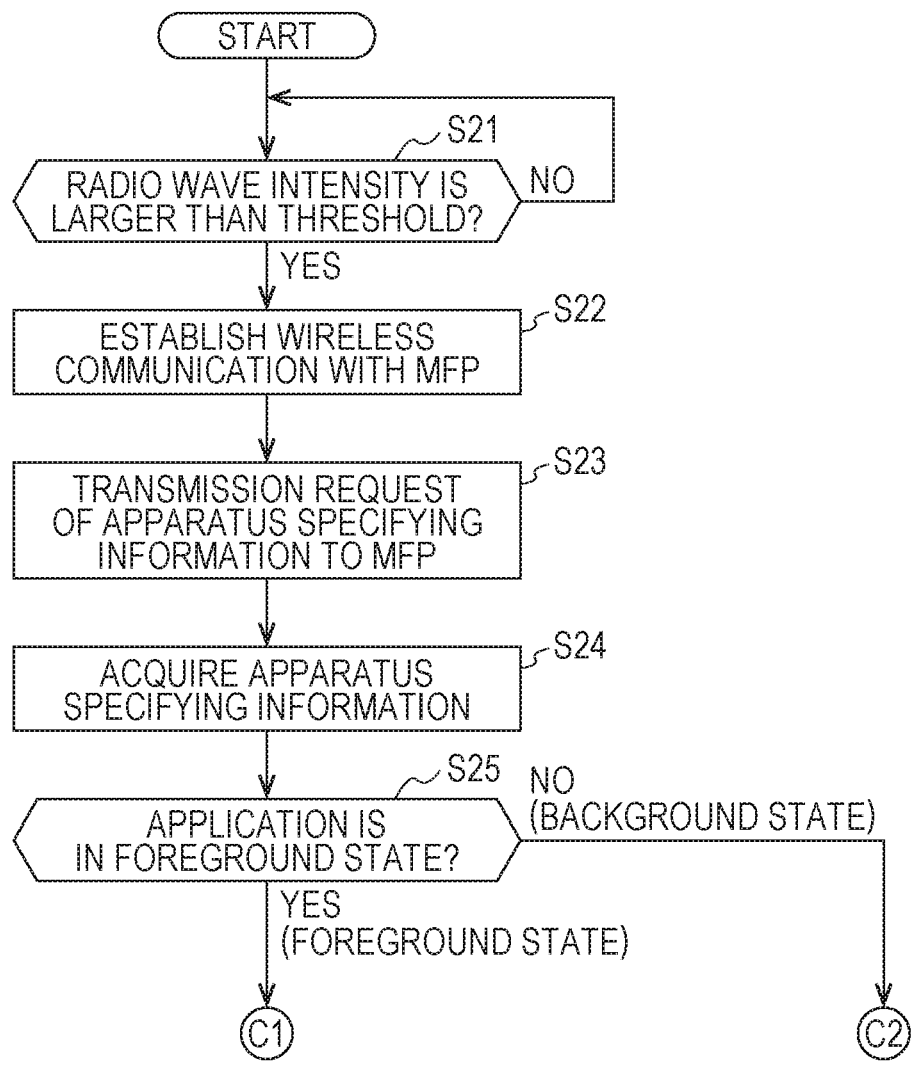
FIG. 6 is a flowchart illustrating actions of the mobile terminal.

In the mobile terminal 50, the program for cooperation is running in a foreground running state (also referred to as an active state) or in a background running state (referred to as an inactive state). Various kinds of processing (processing after the proximity determination processing) including the above determination processing (proximity determination processing) is executed by the program for cooperation. FIG. 6 is a flowchart illustrating actions executed by the program for cooperation.

First, in step S21 of FIG. 6, the above described proximity determination processing is performed. Specifically, when the intensity of the radio wave for the proximity wireless communication (for a BLE communication) from the MFP 10 becomes larger than the threshold TH1 for the proximity detection, the mobile terminal 50 determines that the terminal itself approaches the MFP 10 within the predetermined range. In other words, the mobile terminal 50 detects the proximity to the MFP 10. When determining that the terminal itself approaches the MFP 10 within the predetermined range, the mobile terminal 50 temporarily determines the MFP 10 (for example, 10a) as a cooperation destination apparatus, and the processing proceeds to step S22.

In step S22, the mobile terminal 50 extracts, from the advertising data, apparatus identification information included in the radio wave for the proximity wireless communication (particularly, the advertising data) from the cooperation destination apparatus (the MFP 10a) (information to identify apparatuses). For example, a media access control (MAC) address of an MFP 10a is extracted as the apparatus identification information. In the above described manner, the mobile terminal 50 acquires the apparatus identification information using the radio waves for the proximity wireless communication from the MFP 10a.

Figure 10:
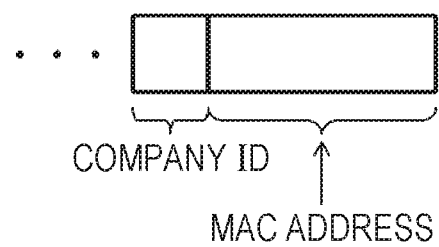
FIG. 10 is a diagram illustrating advertising data.

In the advertising data, a region which can be freely used for each BLE user company (customizable region) is allocated. More specifically, a description region for a company ID and a customizable region (a custom data region for each company) following the description region for the company ID are provided in the advertising data. Here, it is assumed that the MAC address of the MFP 10 (a transmission source apparatus of the advertising data) is described (included) in the customizable region of the advertising data (see FIG. 10).

Figure 9:
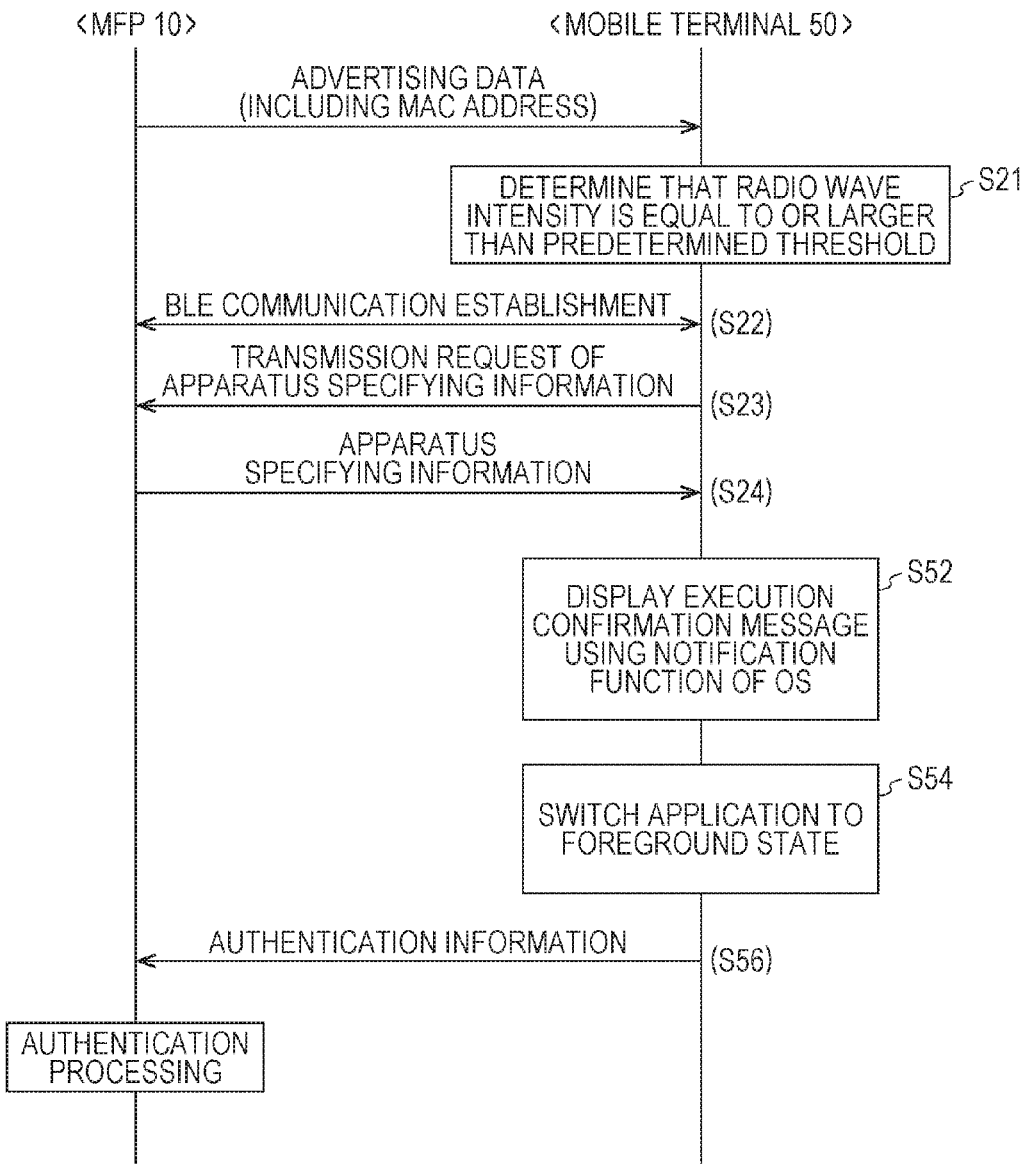
FIG. 9 is a timing chart illustrating action examples in a communication system.

Furthermore, in step S22, the mobile terminal 50 establishes a wireless communication with the MFP 10a (for example, a BLE wireless communication) (see also FIG. 9).

In next steps S23 and S24, the mobile terminal 50 acquires, based on the apparatus identification information, information for a user to specify a desired image forming apparatus (hereinafter, also referred to as apparatus specifying information). Note that, the apparatus specifying information is information to specify an image forming apparatus from a plurality of image forming apparatuses, and information in order for a user to determine whether a certain image forming apparatus (an image forming apparatus to cooperate with the mobile terminal 50) is the desired image forming apparatus. The certain image forming apparatus can be described as the image forming apparatus which is temporarily determined as the cooperation destination apparatus of the mobile terminal 50 (a temporarily determined apparatus).

Specifically, first, the mobile terminal 50 transmits, to the MFP 10, a transmission request of the apparatus specifying information on the MFP 10 (step S23). More particularly, the transmission request of the apparatus specifying information corresponding to the MAC address (the apparatus identification information) (the transmission request designating the MAC address) is transmitted. The MFP 10 extracts, in response to the transmission request, the apparatus specifying information from an apparatus data table (apparatus information) 300 (FIG. 12) stored in the storage unit 5 of the MFP 10. FIG. 12 is a diagram illustrating the apparatus data table 300. As illustrated in FIG. 12, the MAC address, the IP address, the model name, the apparatus name, and the like of the MFP 10 are stored in the apparatus data table 300 of the MFP 10. The MFP 10 refers to the apparatus data table 300, confirms that the MAC address transmitted from the mobile terminal 50 matches the MAC address of the apparatus itself (the MAC address in the apparatus data table 300), and further extracts the model name, the apparatus name, and the like of the apparatus itself from the apparatus data table 300 as the apparatus specifying information. For example, the model name "C652" of the MFP 10a and the apparatus name "6th floor east side 1" of the MFP 10a are extracted as the apparatus specifying information on the MFP 10a.

Note that, although the mobile terminal 50 transmits the transmission request of the apparatus specifying information corresponding to a particular MAC address (the transmission request designating the particular MAC address) here, the transmission request is not limited to this. For example, when a BLE communication establish destination is always fixed or the like, the transmission request of the apparatus specifying information (on the MFP 10a which is the BLE communication establish destination) may be simply transmitted to the MFP 10a which is the BLE communication establish destination. Then, the mobile terminal 50 may acquire the apparatus specifying information returned from the MFP 10a as the apparatus specifying information corresponding to the MFP 10a (the particular MAC address).

Then, the MFP 10 transmits the extracted apparatus specifying information to the mobile terminal 50. In other words, the mobile terminal 50 receives the apparatus specifying information returned in response to the transmission request from the MFP 10a (step S24).

In the above described manner, the mobile terminal 50 acquires the apparatus specifying information on the MFP 10a which is the login target through the proximity wireless communication (here, the BLE communication) with the MFP 10a.

In next step S25, it is determined whether the program for cooperation (application for cooperation) is in the foreground running state or in the background running state.

Figure 7:
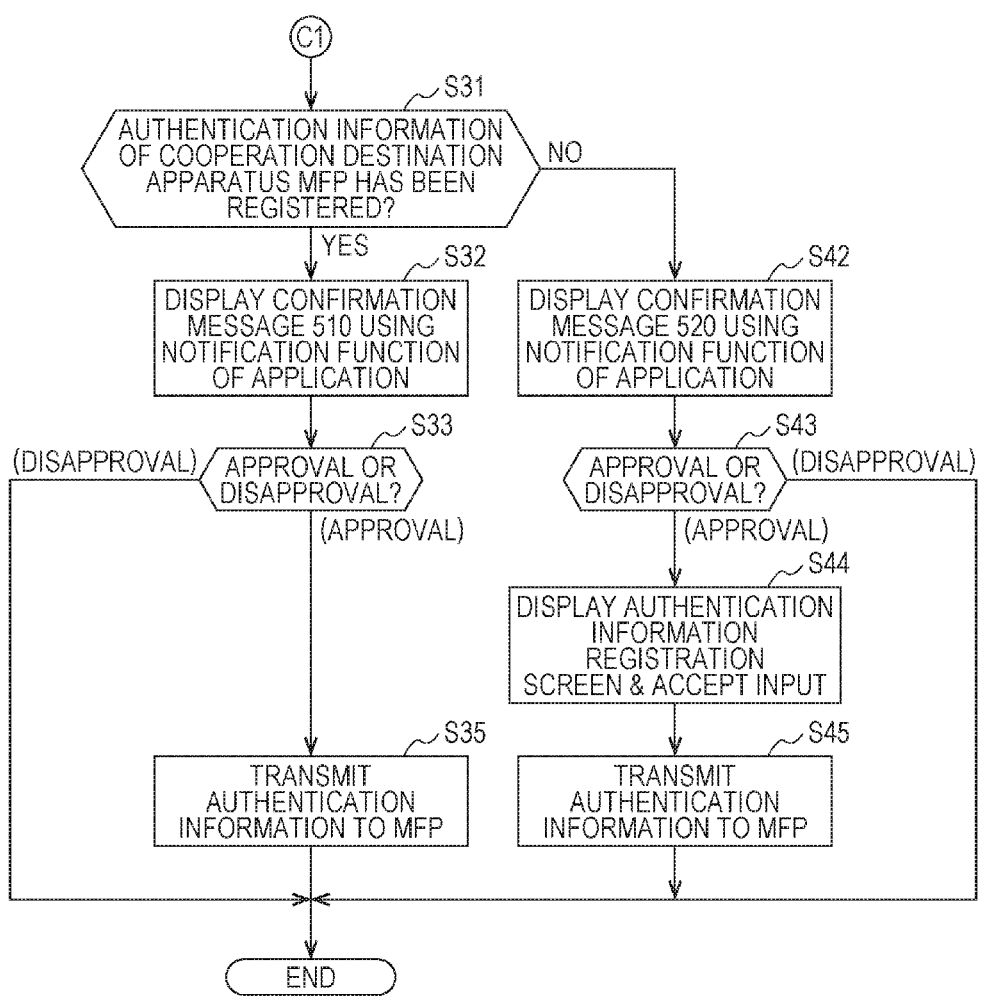
FIG. 7 is a flowchart illustrating actions of the mobile terminal (when a program for cooperation is in a foreground running state)

When the program for cooperation is in the foreground running state, the processing proceeds to step S31 in the flowchart of FIG. 7. On the other hand, when the program for cooperation is in the background running state, the processing proceeds to step S51 in the flowchart of FIG. 8.

Note that, as to be described later, the confirmation message 500 (see FIGS. 14 and 15) is displayed when the program for cooperation is in the foreground running state, and the confirmation message 700 (see FIGS. 17 and 18 and the like) is displayed when the program for cooperation is in the background running state.

<4-2. The Case Where the Program for Cooperation is in the Foreground Running State>

First, actions of each apparatus when the program for cooperation is in the foreground running state will be described with reference to FIG. 7.

In step S31, the mobile terminal 50 determines whether user authentication information for the MFP 10a has been registered in the mobile terminal 50. Specifically, the mobile terminal 50 determines the matter based on a registration data table (registration information) 400 (401) (see FIG. 13) registered in the mobile terminal 50. When the authentication information (both of the user ID and the password) corresponding to the MAC address of the MFP 10a (the cooperation destination apparatus) is stored in the registration data table 401, the mobile terminal 50 determines that the user authentication information for the MFP 10a has been registered. On the other hand, when the authentication information corresponding to the MAC address of the MFP 10a is not completed (when at least one of the user ID and the password is blank), the mobile terminal 50 determines that the user authentication information for the MFP 10a has not been registered.

<4-2-1. The Case Where the User Authentication Information has Been Registered>

When it is determined that the user authentication information for the cooperation destination apparatus (the MFP 10a) has been registered in the mobile terminal 50 (particularly, in the registration data table 400), the processing proceeds from step S31 to step S32. For example, when the user authentication information (the user ID "SUZUKI1" and the password "******") corresponding to the MAC address ("11:22:33:44:55:66") of the MFP 10a is in the registration data table 400 as illustrated in FIG. 13, the processing proceeds to step S32.

Figure 14:
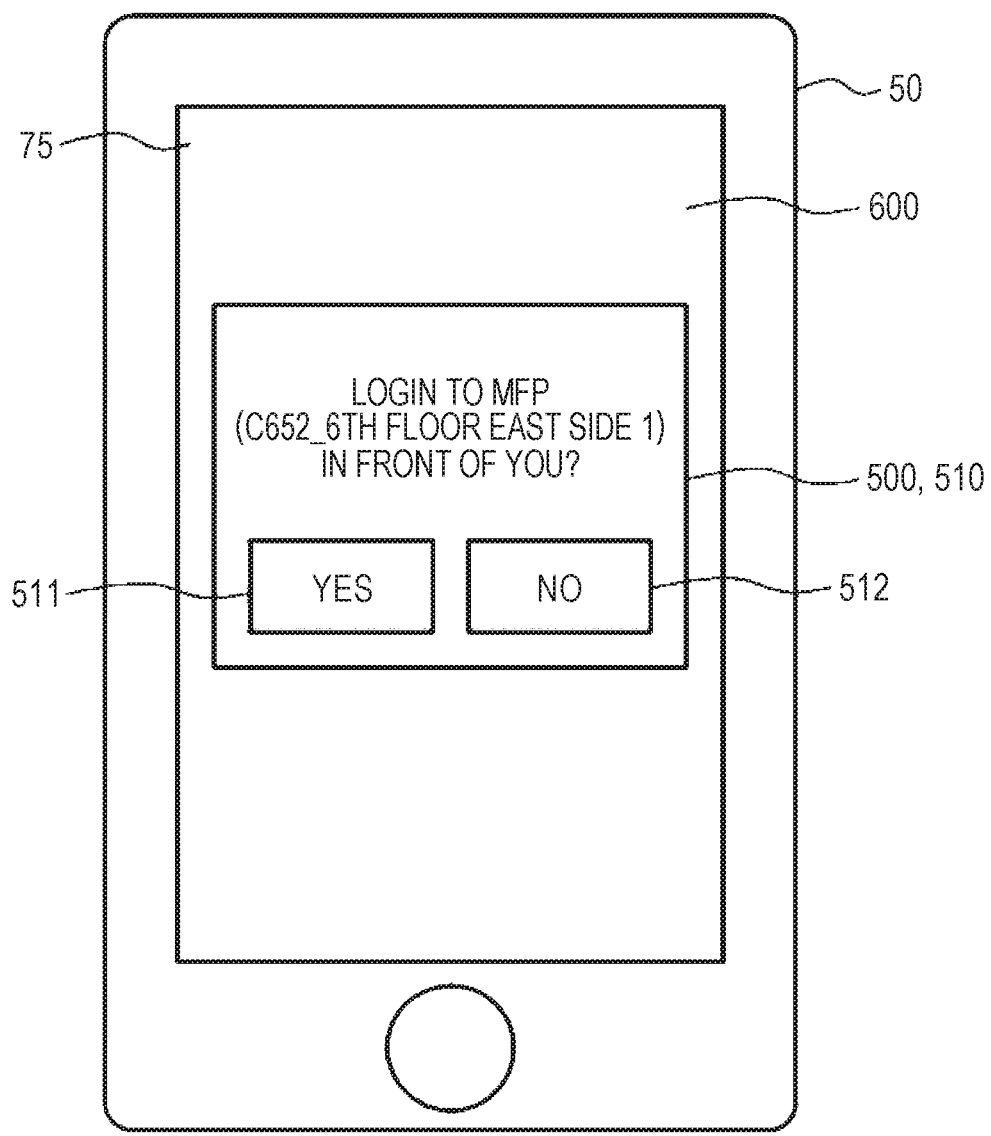
FIG. 14 is a diagram illustrating a confirmation message.

In this case, in step S32, the mobile terminal 50 displays a confirmation message 510 (500) as illustrated in FIG. 14 on the touch panel 75. The confirmation message 510 is a message to confirm the execution of the authentication action in the MFP 10. Furthermore, the confirmation message 510 has words, for example, "Login to MFP (C652_6th floor east side 1) in front of you?", and has the apparatus specifying information ("C652" and "6th floor east side 1"). In other words, the information on the combination of the model name "C652" and the apparatus name "6th floor east side 1" is included in the confirmation message 510 as the apparatus specifying information. Note that, the apparatus specifying information is not limited to this, and for example, only the apparatus name of the model name "C652" and the apparatus name "6th floor east side 1" of the MFP 10a may be used as the apparatus specifying information on the MFP 10a.

The confirmation message 510 is displayed on the touch panel 75 under the direct control of the cooperative application. Specifically, the confirmation message 510 is displayed in a screen 600 of the cooperative application in the foreground running state. More particularly, the confirmation message 510 is displayed in a dialogue screen superimposed on the screen 600 of the cooperative application.

Then, the mobile terminal 50 waits for the approval to the confirmation message 510.

The user checks the contents of the confirmation message 510 and determines whether the image forming apparatus 10a ("C652_6th floor east side 1") temporarily determined as the cooperation destination apparatus of the mobile terminal 50 is the desired image forming apparatus. When the image forming apparatus 10a ("C652_6th floor east side 1") is the desired image forming apparatus, the user pushes a "YES" button 511 in the confirmation message 510.

When the user approves the confirmation message 510 by pushing the "YES" button 511 in the confirmation message 510, the processing proceeds from step S33 to step S35.

Note that, when the user disapproves the confirmation message 510 by pushing a "NO" button 512 in the confirmation message 510, the processing does not proceed to step S35 and the flowcharts of FIGS. 6 and 7 are temporarily terminated. Thereafter, the processing is started from step S21 (FIG. 6) after a certain period of time passes.

In step S35, in response to the confirmation operation to the confirmation message by the user (the pushing operation of the "YES" button 511) (approval operation), the mobile terminal 50 determines, as the cooperation destination apparatus, the MFP 10a temporarily determined as the cooperation destination apparatus, and executes the authentication action related to the MFP 10a. Specifically, the mobile terminal 50 extracts, from the registration data table 400, the user authentication information registered in the registration data table 400 (FIG. 13) (more particularly, the user authentication information for the MFP 10 (10a)), and transmits the extracted user authentication information to the MFP 10a. In contrast, the MFP 10a executes authentication processing based on the user authentication information (collation processing between the received user authentication information and the authorized user authentication information).

Figure 19:
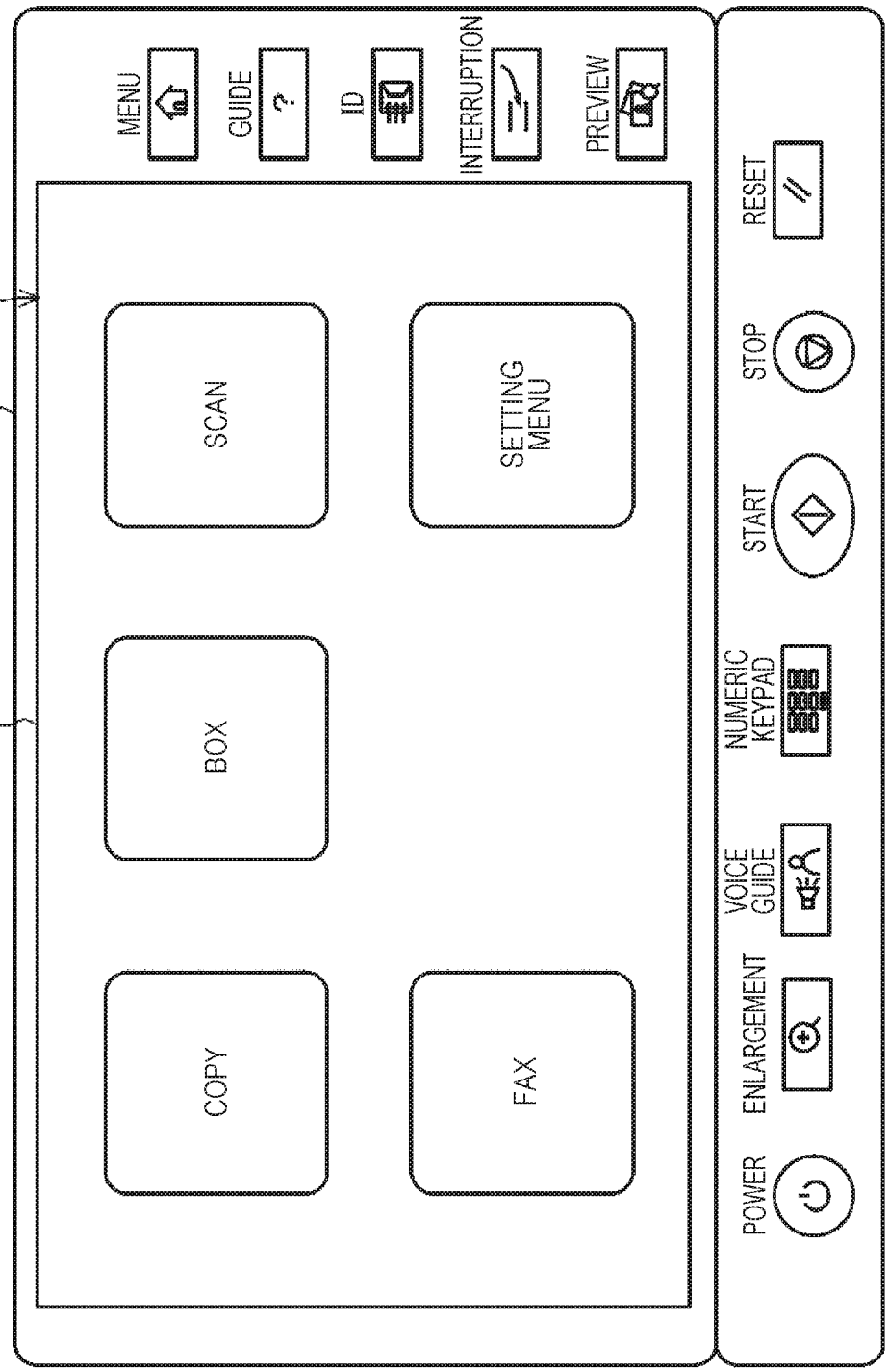
FIG. 19 is a diagram illustrating a display screen (top menu screen)

When the authentication is succeeded, the MFP 10 changes the display screen of the touch panel 25. Specifically, the display screen of the touch panel 25 is changed from the display screen 201 of FIG. 11 to a display screen. 202 of FIG. 19. The display screen 201 is the display screen before login (the login acceptance screen), and the display screen 202 is the display screen immediately after login (the top menu screen). The user can further proceed with the processing using the display screen 202 of the touch panel 25 or a display screen displayed on the touch panel 75 (for example, a simulation screen of the display screen 202).

Note that, when the authentication is failed, the display screen of the touch panel 25 is not changed, and the display screen 201 of FIG. 11 is continuously displayed.

<4-2-2. The Case Where the User Authentication Information Has Not Been Registered>

On the other hand, when it is determined that the user authentication information for the cooperation destination apparatus (the MFP 10a) has not been registered in the mobile terminal 50 (particularly, in the registration data table 400) in step S31 (FIG. 7), the processing proceeds to step S42. For example, when the user authentication information corresponding to the MAC address ("11:22:33:44:55:66") of the MFP 10a is not in the registration data table 400, the processing proceeds from step S31 to step S42.

Figure 15:
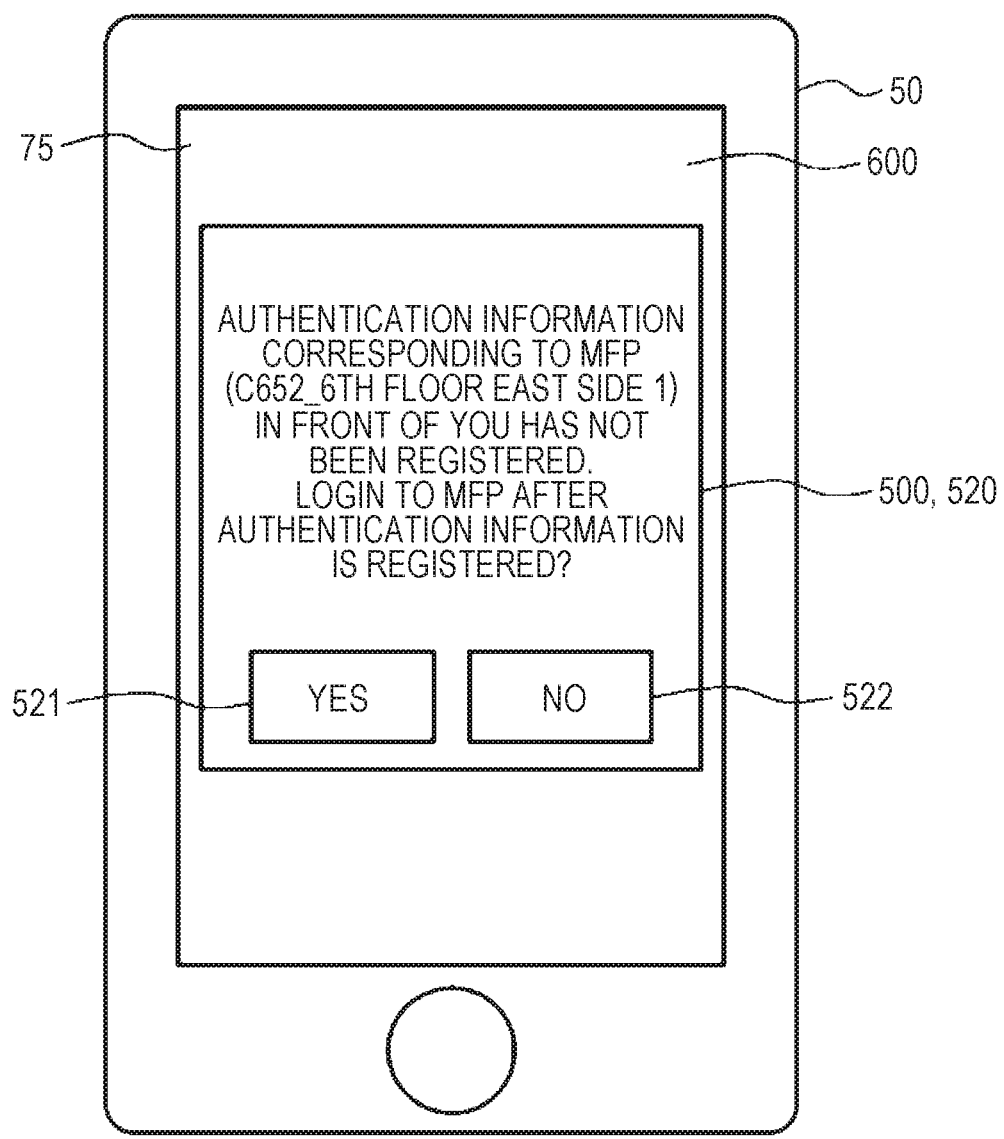
FIG. 15 is a diagram illustrating a confirmation message.

In this case, in step S42, the mobile terminal 50 displays a confirmation message 520 (500) as illustrated in FIG. 15 on the touch panel 75. The confirmation message 520 is a message to confirm the execution of the authentication action in the MFP 10 (more particularly, the authentication action including an authentication information input action). Furthermore, the confirmation message 520 has words, for example, "Authentication information corresponding to MFP (C652_6th floor east side 1) in front of you has not been registered. Login to MFP after authentication information is registered?", and has the apparatus specifying information ("C652" and "6th floor east side 1")

The confirmation message 520 is displayed in a screen 600 of the cooperative application in the foreground running state. More particularly, the confirmation message 520 is displayed in a dialogue screen superimposed on the screen 600 of the cooperative application.

Then, the mobile terminal 50 waits for the approval to the confirmation message 520.

The user checks the contents of the confirmation message 520 and determines whether the image forming apparatus 10a ("C652_6th floor east side 1") temporarily determined as the cooperation destination apparatus of the mobile terminal 50 is the desired image forming apparatus.

When the user approves the confirmation message 520 by pushing the "YES" button 521 in the confirmation message 520, the processing proceeds from step S43 to step S44.

Note that, when a "NO" button 522 in the confirmation message 520 is pushed and the confirmation message 520 is not approved (in the case of "disapproval"), the processing does not proceed to step S41 and the flowcharts of FIGS. 6 and 7 are temporarily terminated. Thereafter, the processing is started from step S21 (FIG. 6) after a certain period of time passes.

Figure 16:
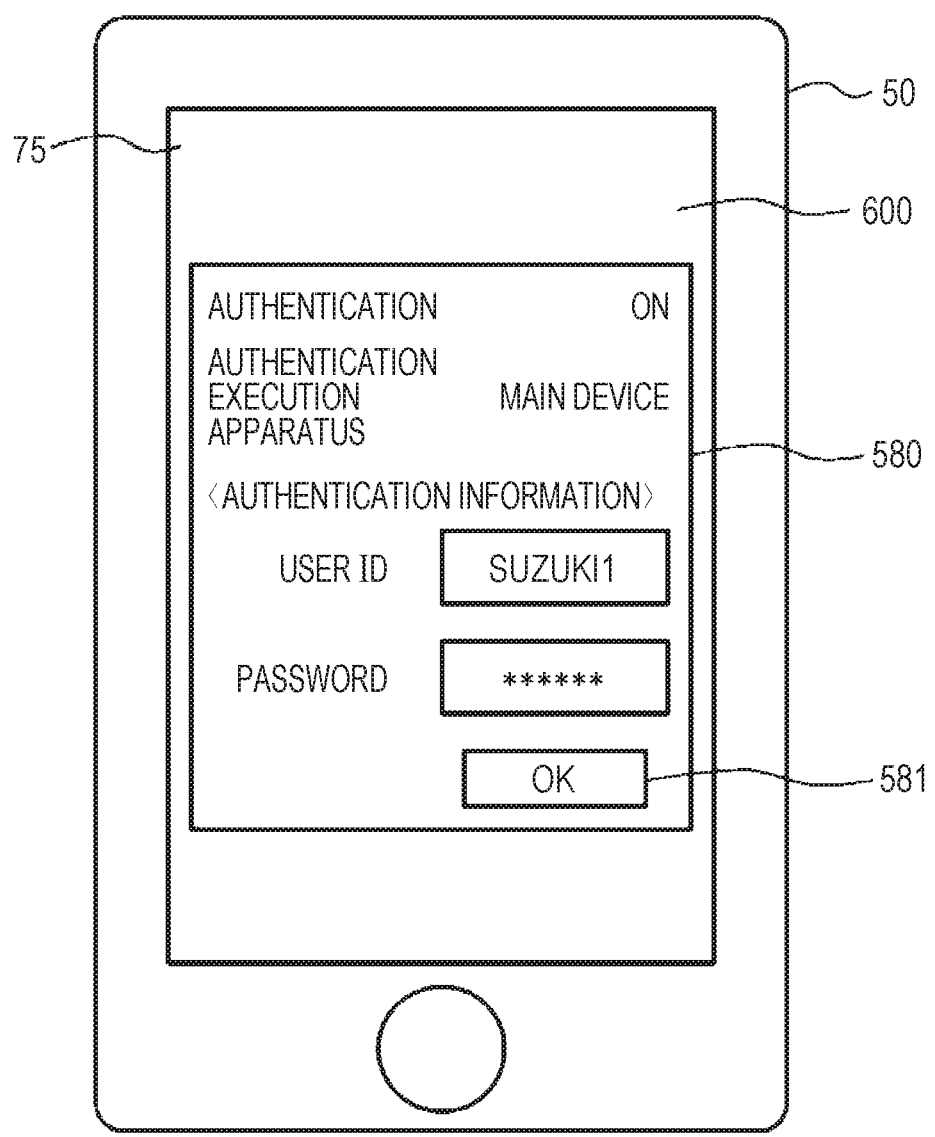
FIG. 16 is a diagram illustrating an input screen for authentication information.

In step S44, in response to the confirmation operation (approval operation) to the confirmation message 520 (500) by the user, the mobile terminal 50 displays an input screen 580 for the user authentication information (FIG. 16) on the touch panel 75. The input screen 580 is a screen having input fields for various kinds of authentication information (such as a user ID and a password) as illustrated in FIG. 16. The input screen 580 is a screen to be displayed in the screen 600 of the cooperative application in the foreground running state (more particularly, a dialogue screen to be superimposed on the screen 600). The input for the user authentication information is accepted using the input screen 580.

When an OK button 581 is pushed after the input of the user ID, the password, and the like and the input contents is determined in the input screen 580, the mobile terminal 50 registers (additionally registers) the input user authentication information in the registration data table 400 in the mobile terminal 50, and the processing proceeds to step S45.

In step S45, processing similar to step S35 is executed. Specifically, the mobile terminal 50 determines, as the cooperation destination apparatus, the MFP 10a temporarily determined as the cooperation destination apparatus, and transmits the user authentication information input (registered) in step S44 to the MFP 10 (10a) (step S45). In contrast, the MFP 10 executes authentication processing based on the user authentication information (collation processing between the received user authentication information and the authorized user authentication information) and the like.

As described above, the mobile terminal 50 acquires the apparatus specifying information ("C652", "6th floor east side 1", and the like) through the proximity wireless communication with the MFP 10, and displays the confirmation message including the apparatus specifying information. More particularly, when the cooperative application runs in the foreground, the confirmation message 500 (510 or 520) is displayed in a screen of the cooperative application. The confirmation message 500 is displayed under the direct control of the cooperative application. Then, the authentication processing and the like are performed on a condition that the approval operation to the confirmation message 500 is executed.

Thus, the user can proceed with the cooperative processing with the desired MFP 10 after the user browses the apparatus specifying information included in the confirmation message 500 and confirms that the authentication target apparatus is the desired MFP 10 (for example, the MFP 10a having the apparatus name "6th floor east side 1"). In other words, it is possible to confirm that the MFP 10 which is the cooperation destination of the mobile terminal 50 is the user's desired MFP 10 in the case where the cooperative action between the MFP 10 and the user s mobile terminal 50 is to be performed. More specifically, for example, when two MFPs 10 (the MFP 10a having the apparatus name "6th floor east side 1" and an MFP 10b having the apparatus name "6th floor east side 2") are arranged in proximity to each other, it is possible to reliably proceed with the login process (the authentication processing) to an MFP 10 (for example, the MFP 10a having the apparatus name "6th floor east side 1") to which the user wants to login. If the apparatus specifying information on an MFP 10 (for example, the MFP 10b having the apparatus name "6th floor east side 2") other than the user's desired MFP 10a is displayed on the touch panel 75, it is possible to interrupt the authentication processing to the MFP 10b.

Incidentally, it has been described above that the confirmation message 500 is displayed when the cooperative application runs in the foreground.

On the other hand, when the cooperative application runs in the background, the cooperative application cannot display the confirmation message 500 directly in a screen of the cooperative application under the direct control of the cooperative application. In other words, the cooperative application running in the background cannot display a screen of the cooperative application to be superimposed on a screen (or a home screen) of another application running in the foreground.

Thus, in the embodiment, in the case where the cooperative application runs in the background, the confirmation message 700 is displayed on the touch panel 75 of the mobile terminal 50 using a notification function of the operating system (OS) of the mobile terminal 50 as to be described later.

<4-3. The Case Where the Program for Cooperation is in the Background Running State>

Next, actions of each apparatus when the program for cooperation is in the background running state will be described with reference to FIG. 8.

In step S51, the mobile e terminal 50 determines whether the user authentication information for the MFP 10 has been registered in the mobile terminal 50. Specifically, the mobile terminal 50 determines the matter based on a registration data table (registration information) 400 registered in the mobile terminal 50 (see FIG. 13). In step S51, determination processing similar to step S31 is performed.

<4-3-1. The Case Where the User Authentication Information has Been Registered>

When it is determined that the user authentication information for the cooperation destination apparatus (the MFP 10*a*) has been registered in the mobile terminal 50 (particularly, in the registration data table 400), the processing proceeds from step S51 to step S52. For example, when the user authentication information (the user ID "SUZUKI1" and the password "****") corresponding to the MAC address ("11:22:33:44:55:66") of the MFP 10***a* is in the registration data table 400 as illustrated in FIG. 13, the processing proceeds to step S52.

Figure 17:
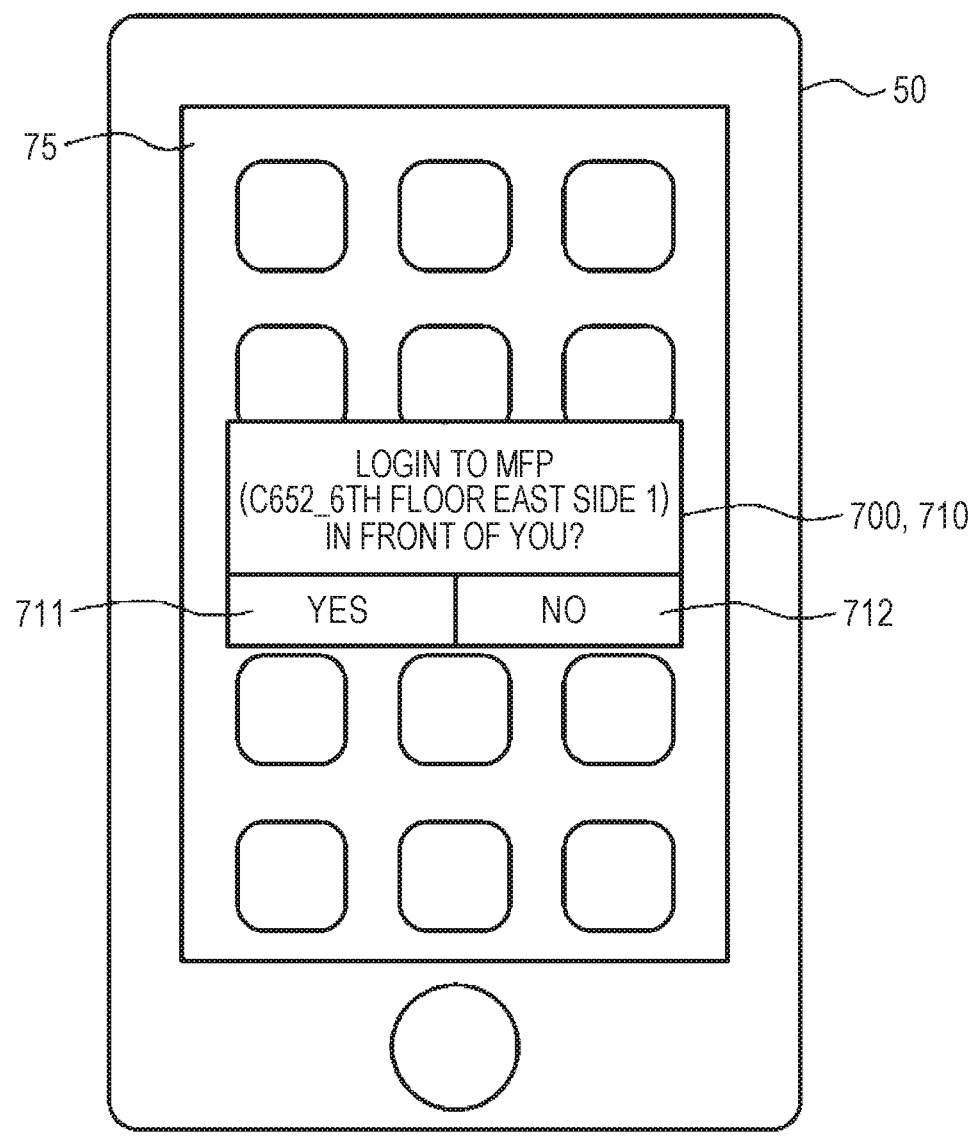
FIG. 17 is a diagram illustrating a confirmation message.

In this case, in step S52, the mobile terminal 50 displays a confirmation message 710 (700) as illustrated in FIG. 17 on the touch panel 75. The confirmation message 710 is a message to confirm the execution of the authentication action in the MFP 10. The confirmation message 710 has words, for example, "Login to MFP (C652_6th floor east side 1) in front of you?", and has the apparatus specifying information ("C652" and "6th floor east side 1"). In other words, the information on the combination of the model name "C652" and the apparatus name "6th floor east side 1" is included in the confirmation message 710 as the apparatus specifying information.

The confirmation message 710 is displayed on the touch panel 75 using a notification function of the operating system (OS) of the mobile terminal 50 (see FIG. 17).

The notification function of the OS of the mobile terminal 50 is one of functions provided by the OS, and is a function to notify a user of a message related to each application (application in the inactive state) through the OS. According to the notification function of the OS, it is possible to notify a user of a message related to a certain application running in the background.

Specifically, the cooperative application executed in the background delivers, to the OS, text information indicating the confirmation message 710 (character string information) and action contents at the operation acceptance to the confirmation message 710 (an execution command and the like described in a URL scheme). In step S52, as the action contents at the time of pushing the "YES" button, it is designated that the cooperative application is to be changed to the foreground running state and that the authentication action (more particularly, the transmission action of the authentication information) is to be executed in the cooperative application. These are designated using, for example, a URL scheme "application1://auth?". Note that, the URL scheme is designated with the format "(application name):// ((in application) command name)?".

The OS displays the confirmation message 710 on the touch panel 75 based on the text information received from the cooperative application. For example, the confirmation message 710 superimposed on a screen displayed on the foreground at the time (for example, a home screen or a screen of another application) is displayed.

Then, the mobile terminal 50 waits for the approval to the confirmation message 710.

The user checks the contents of the confirmation message 710 and determines whether the image forming apparatus 10*a* ("C652_6th floor east side 1") temporarily determined as the cooperation destination apparatus of the mobile terminal 50 is the desired image forming apparatus.

When the user approves the confirmation message 710 by pushing the "YES" button 711 in the confirmation message 710, the processing proceeds from step S53 to step S54.

Figure 8:
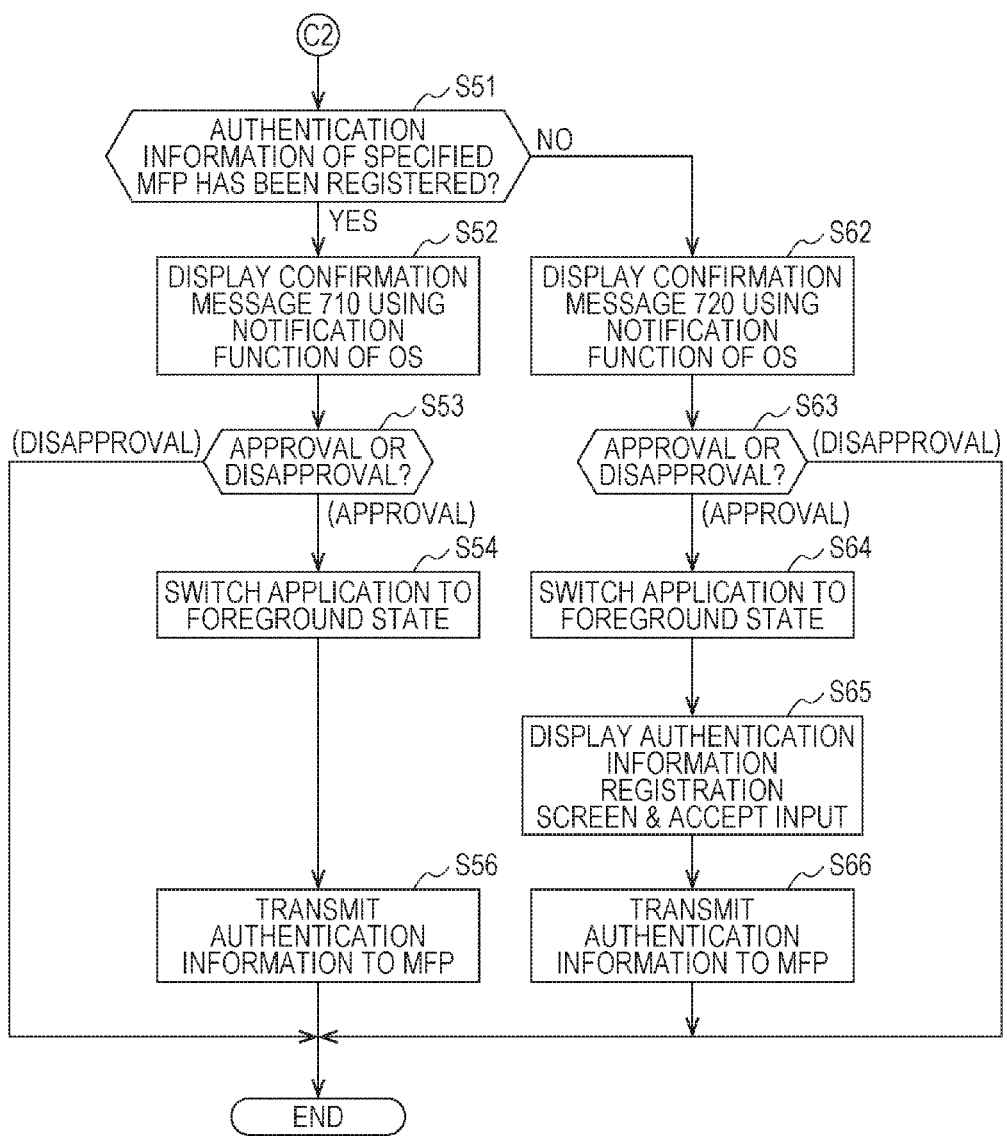
FIG. 8 is a flowchart illustrating actions of the mobile terminal (when a program for cooperation is in a background running state)

Note that, when the user disapproves the confirmation message 710 by pushing a "NO" button 712 in the confirmation message 710, the processing does not proceed to step S54 and the flowcharts of FIGS. 6 and 8 are temporarily terminated. Thereafter, the processing is started from step S21 (FIG. 6) after a certain period of time passes.

In step S54, the cooperative application is changed from the background running state to the foreground running state. Furthermore, in next step S55, the mobile terminal 50 determines, as the cooperation destination apparatus, the MFP 10*a* temporarily determined as the cooperation destination apparatus, and executes the authentication action related to the MFP 10*a*.

Specifically, the action based on the URL scheme designated as the command to be executed at the time of pushing the "YES" button 711 is performed. For example, based on the URL scheme "application1://auth?", the cooperative application ("application 1") is changed to the foreground running state, and the authentication action (the action corresponding to the command "auth") as the action in the cooperative application (more particularly, the transmission action of the authentication information) is executed. The authentication action is similar to step S35.

Particularly, the mobile terminal 50 extracts, from the registration data table 400, the user authentication information registered in the registration data table 400 (FIG. 13) (more particularly, the user authentication information for the MFP 10 (10*a*)), and transmits the extracted user authentication information to the MFP 10*a*. In contrast, the MFP 10*a* executes authentication processing based on the user authentication information (collation processing between the received user authentication information and the authorized user authentication information).

When the authentication is succeeded, the MFP 10 changes the display screen of the touch panel 25. Specifically, the display screen of the touch panel 25 is changed from the display screen 201 of FIG. 11 to a display screen 202 of FIG. 19.

Note that, when the authentication is failed, the display screen of the touch panel 25 is not changed, and the display screen 201 of FIG. 11 is continuously displayed.

<4-3-2. The Case where the User Authentication Information Has Not Been Registered>

On the other hand, when it is determined that the user authentication information for the cooperation destination apparatus (the MFP 10*a*) has not been registered in the mobile terminal 50 (particularly, in the registration data table 400) in step S51, the processing proceeds to step S62. For example, when the user authentication information corresponding to the MAC address ("11:22:33:44:55:66") of the MFP 10a is not in the registration data table 400, the processing proceeds from step S51 to step S62.

Figure 18:
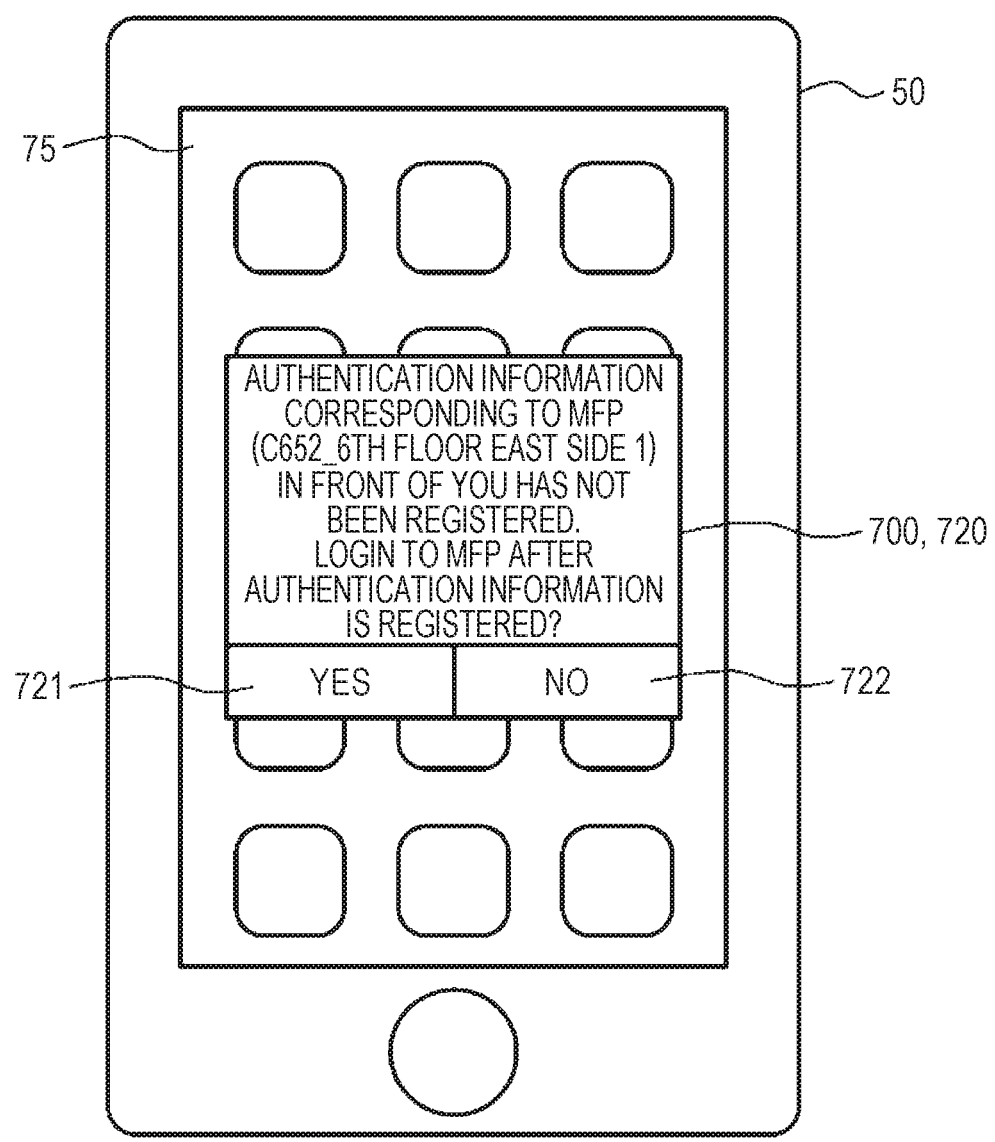
FIG. 18 is a diagram illustrating a confirmation message.

In this case, in step S62, the mobile terminal 50 displays a confirmation message 720 (700) as illustrated in FIG. 18 on the touch panel 75. The confirmation message 720 is a message to confirm the execution of the authentication action in the MFP 10a (more particularly, the authentication action including an authentication information input action). Furthermore, the confirmation message 720 has words, for example, "Authentication information corresponding to MFP (C652_6th floor east side 1) in front of you has not been registered. Login to MFP after authentication information is registered?", and has the apparatus specifying information ("C652" and "6th floor east side 1").

The confirmation message 720 is displayed on the touch panel 75 using a notification function of the operating system (OS) of the mobile terminal 50 (see FIG. 17).

Specifically, the cooperative application executed in the background delivers, to the OS, text information indicating the confirmation message 720 (character string information) and action contents at the operation acceptance to the confirmation message 720 (an execution command and the like described in a URL scheme). In step S52, as the action contents at the time of pushing the "YES" button, it is designated that the cooperative application is to be changed to the foreground running state and that the authentication action (more particularly, the registration action (the input action) of the authentication information) is to be executed in the cooperative application. These are designated using, for example, the URL scheme "application1://register?".

The OS displays the confirmation message 720 on the touch panel 75 based on the received text information. For example, the confirmation message 720 superimposed on a screen displayed at the time (for example, a home screen or a screen of another application) is displayed.

Then, the mobile terminal 50 waits for the approval to the confirmation message 720.

The user checks the contents of the confirmation message 720 and determines whether the image forming apparatus 10a ("C652_6th floor east side 1") temporarily determined as the cooperation destination apparatus of the mobile terminal 50 is the desired image forming apparatus.

When the user approves the confirmation message 720 by pushing the "YES" button 721 in the confirmation message 720, the processing proceeds from step S63 to step S64.

Note that, when the user disapproves the confirmation message 720 by pushing a "NO" button 722 in the confirmation message 720, the processing does not proceed to step S64 and the flowcharts of FIGS. 6 and 8 are temporarily terminated. Thereafter, the processing is started from step S21 (FIG. 6) after a certain period of time passes.

In step S64, the cooperative application is changed from the background running state to the foreground running state. Furthermore, in next step S65, the mobile terminal 50 determines, as the cooperation destination apparatus, the MFP 10a temporarily determined as the cooperation destination apparatus, and executes the registration action of the authentication information on the MFP 10a.

Specifically, the action based on the URL scheme designated as the command to be executed at the time of pushing the "YES" button 721 is performed. For example, based on the URL scheme "application1://register?", the cooperative application is changed to the foreground running state, and the registration action (the input action) of the authentication information is executed in the cooperative application.

More specifically, in step S65, the mobile terminal 50 displays the input screen 580 for the user authentication information (FIG. 16) on the touch panel 75 in response to the push of the "YES" button 721.

When the OK button 581 is pushed after the user authentication information is input using the input screen 580, the processing proceeds to step S66. In step S66, an action similar to step S45 is executed. Specifically, the mobile terminal 50 transmits the input user authentication information to the MFP 10 (10a). In contrast, the MFP 10 executes authentication processing based on the user authentication information (collation processing between the received, user authentication information and the authorized user authentication information) and the like.

As described above, in the case where the cooperative application runs in the background, the mobile terminal 50 acquires the apparatus specifying information ("C652", "6th floor east side 1", and the like) through the proximity wireless communication with the MFP 10, and displays the confirmation message including the apparatus specifying information. Specifically, the confirmation message 700 (710 or 720) is displayed on the touch panel 75 using the notification function of the OS. Then, the authentication processing and the like are performed on a condition that the approval operation to the confirmation message 700 is executed.

Thus, the user can proceed with the cooperative processing with the desired MFP 10 after the user browses the apparatus specifying information included in the confirmation message 700 and confirms that the authentication target apparatus is the desired MFP 10 (for example, the MFP 10a having the apparatus name "6th floor east side 1"). In other words, it is possible for user to confirm that the MFP 10 which is the cooperation destination of the mobile terminal 50 is the user's desired MFP 10 in the case where the cooperative action between the MFP 10 and the user's mobile terminal 50 is to be performed. More specifically, for example, when two MFPs 10 (the MFP 10a having the apparatus name "6th floor east side 1" and the MFP 10b having the apparatus name "6th floor east side 2") are arranged in proximity to each other, it is possible to reliably proceed with the login process (the authentication processing) to an MFP 10 (for example, the MFP 10a having the apparatus name "6th floor east side 1") to which the user wants to login. If the apparatus specifying information on an MFP 10 (for example, the MFP 10b having the apparatus name "6th floor east side 2") other than the user's desired MFP 10a is displayed on the touch panel 75, it is possible for the user to interrupt the authentication processing to the MFP 10b.

Especially, in the above description, when the cooperative application is in the background running state, the confirmation message 700 is displayed using the notification function of the OS of the mobile terminal 50. Thus, when the cooperative application is not in the active state, the mobile terminal 50 can reliably perform the cooperative processing with the user's desired MFP 10.

Furthermore, in the above description, when the user authentication information for the MFP 10a is in the registration data table 400, the mobile terminal 50 displays the confirmation message 710 on the touch panel 75. Then, when the contents of the confirmation message 710 is approved, the cooperative application is changed to the active state (the foreground running state) and the transmission processing of the authentication information is immediately executed.

On the other hand, when the user authentication information for the MFP 10a is not in the registration data table 400, the mobile terminal 50 displays the confirmation message 720 on the touch panel 75. Then, when the contents of the confirmation message 720 is approved, the cooperative application is changed to the active state (the foreground running state) and the input screen 580 for the user authentication information is displayed. Furthermore, the registration processing of the authentication information is executed using the input screen 580. According to this, since the input screen 580 is immediately displayed after the contents of the confirmation message 720 is approved, it is possible for the user to start to input the user authentication information at once without performing a menu selection operation to display the input screen 580. Thus, it is possible to provide a user with high operability.

In the above described manner, the cooperative application is changed to the foreground running state (active state) in response to the approval of the confirmation message 700, and the processing is immediately executed according to whether predetermined conditions are satisfied (whether the user authentication information for the MFP 10a is in the registration data table 400). Specifically, each processing designated by an individual URL scheme (more particularly, the command name thereof ("auth"/"register")) is executed. Thus, the processing according to whether the predetermined conditions are satisfied is appropriately executed immediately after the cooperative application is changed from the background running state to the foreground running state.

5. Modification Example and the Like

The embodiments of the present invention have been described, but the embodiments of the present invention are not limited to the ones described above.

For example, although a MAC address has been exemplified as the apparatus identification information in the above embodiments, the apparatus identification information is not limited to this, and an IP address or the like may be used as the apparatus identification information.

Furthermore, in the above embodiments, the mobile terminal 50 has received advertising data transmitted from the MFP 10a using a radio wave for a proximity wireless communication (step S21), and extracted apparatus identification information (MAC address) included in the advertising data from the advertising data. Furthermore, after a BLE communication is established, between the apparatuses 10a and 50 (step S22), a transmission request of the apparatus specifying information corresponding to the apparatus identification information has been transmitted from the mobile terminal 50 to the MFP 10a using the BLE communication (step S23). Then, the mobile terminal 50 has acquired the apparatus specifying information by receiving the apparatus specifying information (the combination of the apparatus name and the model name) returned from the MFP 10a in response to the transmission request (step S24). In short, after receiving the apparatus identification information (the MAC address) from the MFP 10a, the mobile terminal 50 has further acquires the apparatus specifying information (the apparatus name and the like) by communicating with the MFP 10a. However, the present invention is not limited to the above.

For example, in the case where the increase of the data capacity of the advertising data is allowed or the like, the advertising data itself may include the apparatus name and the like of the MFP 10a (the apparatus specifying information). Then, the mobile terminal 50 may extract the apparatus name and the like of the MFP 10a (the apparatus specifying information) from the received advertising data. In other words, the apparatus specifying information may be acquired without requiring the apparatus identification information (the MAC address).

Alternatively, the MAC address (the apparatus identification information) itself included in the advertising data may be acquired as the apparatus specifying information, and a confirmation message including the MAC address (for example, a confirmation message having words "Login to MFP (MAC address=11:22:33:44:55:66) in front of you?") may be displayed. That is, the MAC address (the apparatus identification information) may be directly used as the apparatus specifying information. In other words, the apparatus specifying information may be a "MAC address". More particularly, in the case where a seal describing the MAC address of the MFP 10a is attached to the front of the desired MFP 10a body or the like, a user confirms the identity of the MAC address described on the seal and the MAC address included in the confirmation message. Thus, it is possible for a user to confirm that the authentication target apparatus (the cooperation destination apparatus) is the desired MFP 10a.

Furthermore, in the above embodiment, the MAC address (the apparatus identification information) has been included in the advertising data, and the MAC address (the apparatus identification information) has been acquired in response to the reception of the advertising data (step S21) (before the establishment of the BLE communication (step S22)). However, the acquisition of the apparatus identification information is not limited to this. For example, in the case where the apparatus identification information (the MAC address and the like) is not included in the advertising data, the mobile terminal 50 may acquire, after the BLE communication with the MFP 10a is established (step S22), the apparatus identification information (the MAC address and the like) of the MFP 10a using the BLE communication. More particularly, after the establishment of the BLE communication, the transmission request for the apparatus identification information (the MAC address and the like) on the MFP 10a is transmitted from the mobile terminal 50 to the MFP 10a, and the apparatus identification information (the MAC address and the like) on the MFP 10a is transmitted, in response to the transmission request, from the MFP 10a to the mobile terminal 50 using the BLE communication. In the above described manner, the mobile terminal 50 may acquire the apparatus identification information (the MAC address and the like) on the MFP 10a.

Furthermore, in the above embodiments, the mobile terminal 50 has acquired the apparatus specifying information on the MFP 10a by further communicating with the MFP 10a after acquiring the apparatus identification information, but the acquisition of apparatus specifying information is not limited to this. For example, the mobile terminal 50 may acquire the apparatus specifying information on the MFP 10a which is the login target by extracting the apparatus specifying information on the MFP 10a from a registration data table 402 (400) (FIG. 20) in the storage unit 55. More particularly, the apparatus name ("6th floor east side 1") and the like corresponding to the MAC address transmitted from the MFP 10a (the MAC address of the MFP 10a) is extracted from the registration data table 402 as the apparatus specifying information on the MFP 10a which is the login target. Note that, as illustrated in FIG. 20, various kinds of information on one or more MFPs 10 which have been registered as the cooperation targets (specifically, MAC addresses, IP addresses, model names, apparatus names, authentication information, and the like for each MFP 10) is stored in the registration data table 402 in the mobile terminal 50.

Furthermore, as described above, the apparatus specifying information is not limited to the combination of a model name and an apparatus name and may be, for example, only an "apparatus name", or a "MAC address". Alternatively, the apparatus specifying information may be an "IP address". For example, a confirmation message including the IP address (for example, a confirmation message having words "Login to MFP (IP address=192.168.30.1) in front of you?") may be displayed in the case where a seal describing the IP address of the MFP 10a is attached to the front of the desired MFP 10a body or the like, a user confirms the identity of the IP address described on the seal and the IP address included in the confirmation message. Note that, the IP address of the MFP 10a may be received by the mobile terminal 50 while being included in the advertising data as the apparatus identification information, or may be received from the MFT 10a as the apparatus specifying information in response to the transmission request after the establishment of the BLE communication. As described above, the apparatus specifying information may be an "IP address".

Furthermore, the apparatus specifying information may be a combination, of at least two or more of a MAC address, an IP address, a model name, an apparatus name, and the like.

Furthermore, in the above embodiments, the authentication action related to the MFP 10 (the login action to the MFP 10) has been exemplified as the cooperative action between the mobile terminal 50 and the MFP 10, but the cooperative action is not limited to this.

For example, the cooperative action may include a print output action by the MFP 10. More particularly, it is assumed that, first, a certain print output job is registered in the cooperative application of the mobile terminal 50 (registered in the mobile terminal 50) (at a place distant from the MFP 10) and then the cooperative application is running in the foreground or in the background. In this situation, a confirmation message in order for a user to confirm whether the print output job is to be executed may be displayed on the touch panel 75 according to the proximity of the mobile terminal 50 to the MFP 10. In the confirmation message, contents including the apparatus specifying information is displayed. For example, a confirmation message including words "Output a print of the reserved job from the MFP (C652_6th floor east side 1) in front of you?" is displayed. Then, the print output action related to the print output job may be executed at the MFP 10 in response to the confirmation operation to the confirmation message by the user (the push of the "YES" button or the like).

Alternatively, the cooperative action may include a scan action by the MFP 10. For example, it is assumed that the storage destination of the scan job is designated by the cooperative application of the mobile terminal 50 and then the cooperative application is running in the foreground or in the background. In this situation, a confirmation message, which is a confirmation message in order for a user to confirm whether or the scan job is to be executed and includes the apparatus specifying information, may be displayed on the touch panel 75 according to the proximity of the mobile terminal 50 to the MFP 10. For example, a confirmation message including words "Execute the scan job with the MFP (C652_6th floor east side 1) in front of you?" is displayed. Then, the scan action related to the scan job may be executed at the MFP 10 in response to the confirmation operation to the confirmation message by the user (the push of the "YES" button or the like).

In these cooperative actions, it is possible to obtain effects similar to the above embodiments by displaying a confirmation message including the apparatus specifying information.

According to an embodiment of the present invention, apparatus specifying information (information in order for a user to determine whether an information processing apparatus to cooperate with a mobile terminal is a desired information processing apparatus) is acquired using a proximity wireless communication, a confirmation message, which is a confirmation message to confirmation execution of a cooperative action with the information processing apparatus and includes the apparatus specifying information, is displayed on the mobile terminal, and the cooperative action is executed in response to a confirmation operation to the confirmation message by the user. Thus, when the cooperative action between the information processing apparatus and the user's mobile terminal is performed, it is possible for the user to confirm that the information processing apparatus which is a cooperation destination of the mobile terminal is the user's desired information processing apparatus.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A non-transitory recording medium storing a computer readable program causing a computer incorporated in a mobile terminal to execute the steps of:
  a) acquiring apparatus specifying information of an information processing apparatus other than the mobile terminal in order for a user to determine whether the information processing apparatus, to cooperate with the mobile terminal, is a desired information processing apparatus using a proximity wireless communication with the information processing apparatus;
  b) displaying, on an operation unit of the mobile terminal, a confirmation message which is a confirmation message to confirm execution of a cooperative action with the information processing apparatus and includes the apparatus specifying information; and
  c) executing the cooperative action in response to a confirmation operation to the confirmation message by the user,
  wherein the cooperative action includes an authentication action related to the information processing apparatus.

2. The non-transitory recording medium storing a computer readable program according to claim 1, wherein the information processing apparatus is an image forming apparatus.

3. The non-transitory recording medium storing a computer readable program according to claim 2, wherein the cooperative action further includes a print output action by the image forming apparatus.

4. The non-transitory recording medium storing a computer readable program according to claim 2, wherein the cooperative action further includes a scan action by the image forming apparatus.

5. The non-transitory recording medium storing a computer readable program according to claim 1, wherein the step a) includes the steps of:

a-1) acquiring apparatus identification information using a radio wave for a proximity wireless communication from the information processing apparatus; and a-2) acquiring the apparatus specifying information corresponding to the apparatus identification information.

6. The non-transitory recording medium storing a computer readable program according to claim 5, wherein:

in the step a-1), advertising data transmitted from the information processing apparatus using the radio wave for the proximity wireless communication is received, and the apparatus identification information included in the advertising data is extracted and acquired from the advertising data.

7. The non-transitory recording medium storing a computer readable program according to claim 5, wherein the step a-2) includes the steps of:

a-2-1) transmitting, to the information processing apparatus, a transmission request of the apparatus specifying information corresponding to the apparatus identification information; and a-2-2) acquiring the apparatus specifying information by receiving, from the information processing apparatus, the apparatus specifying information returned in response to the transmission request.

8. The non-transitory recording medium storing a computer readable program according to claim 5, wherein in the step a-2), the apparatus specifying information is acquired by extracting, from a storage unit of the mobile terminal, the apparatus specifying information corresponding to the apparatus identification information.

9. The non-transitory recording medium storing a computer readable program according to claim 1, wherein in the step b), the confirmation message is displayed on a condition that intensity of a radio wave of the proximity wireless communication in the step a) is higher than a predetermined threshold.

10. The non-transitory recording medium storing a computer readable program according to claim 1, wherein:

the program is an application to execute the cooperative action, and in the step b), when the application runs in a foreground, the confirmation message is displayed in a screen of the application under direct control of the application.

11. The non-transitory recording medium storing a computer readable program according to claim 10, wherein:

the cooperative action includes an authentication action related to the information processing apparatus, the step b) includes the steps of:

b-1) determining whether user authentication information for the information processing apparatus is registered in the mobile terminal; and b-2) when the user authentication information for the information processing apparatus is registered in the mobile terminal, displaying, as the confirmation message, a first message which is a first message to confirm execution of the authentication action related to the information processing apparatus and includes the apparatus specifying information, and the step c) includes the step of:

c-1) transmitting, to the information processing apparatus, the user authentication information in response to a confirmation operation to the first message by a user.

12. The non-transitory recording medium storing a computer readable program according to claim 11, wherein:

the step b) further includes the step of:

b-3) when the user authentication information for the information processing apparatus is not registered in the mobile terminal, displaying, as the confirmation message, a second message which is a second message to confirm execution of an authentication information input action in the authentication action in the information processing apparatus and includes the apparatus specifying information, and the step c) further includes the steps of:

c-2) displaying an input screen for the user authentication information in response to a confirmation operation to the second message by a user;

c-3) accepting input of the user authentication information using the input screen; and c-4) after the user authentication information is input, transmitting the user authentication information to the information processing apparatus.

13. The non-transitory recording medium storing a computer readable program according to claim 1, wherein:

the program is an application to execute the cooperative action, and in the step b), when the application runs in a background, the confirmation message is displayed using a notification function of an operating system of the mobile terminal.

14. A mobile terminal comprising:

a processor; and a display, wherein the processor acquires apparatus specifying information of an information processing apparatus other than the mobile terminal which is information in order for a user to determine whether the information processing apparatus, to cooperate with the mobile terminal, is a desired information processing apparatus using a proximity wireless communication with the information processing apparatus, displays a confirmation message, which is a confirmation message to confirm execution of a cooperative action with the information processing apparatus and includes the apparatus specifying information, on the display, and executes the cooperative action in response to a confirmation operation to the confirmation message by a user, wherein the cooperative action includes an authentication action related to the information processing apparatus.

15. The mobile terminal according to claim 14, wherein the information processing apparatus is an image forming apparatus.

16. The mobile terminal according to claim 15, wherein the cooperative action further includes a print output action by the image forming apparatus.

17. The mobile terminal according to claim 15, wherein the cooperative action further includes a scan action by the image forming apparatus.

18. The mobile terminal according to claim 14, wherein the processor acquires apparatus identification information using a radio wave for a proximity wireless communication from the information processing apparatus, and acquires the apparatus specifying information corresponding to the apparatus identification information.

19. The mobile terminal according to claim 14, wherein the processor displays the confirmation message on the display on a condition that intensity of a radio wave of the proximity wireless communication is higher than a predetermined threshold.

20. The mobile terminal according to claim 14, wherein the cooperative action includes an authentication action related to the information processing apparatus.

21. An image forming system comprising:
an image forming apparatus; and
a mobile terminal configured to perform a cooperative action with the image forming apparatus,
wherein:
the mobile terminal includes a processor and a display, and
the processor acquires apparatus specifying information of the image forming apparatus which is information in order for a user to determine whether the image forming apparatus to cooperate with the mobile terminal is a desired image forming apparatus using a proximity wireless communication with the image forming apparatus, displays a confirmation message, which is a confirmation message to confirm execution of a cooperative action with the image forming apparatus and includes the apparatus specifying information, on the display, and executes the cooperative action in response to a confirmation operation to the confirmation message by the user,
wherein the cooperative action includes an authentication action related to the image forming apparatus.

* * * * *